(12) United States Patent
Boss et al.

(10) Patent No.: US 11,965,336 B2
(45) Date of Patent: Apr. 23, 2024

(54) NON-ASPHALTIC COATINGS, NON-ASPHALTIC ROOFING MATERIALS, AND METHODS OF MAKING THEREOF

(71) Applicant: BMIC LLC, Dallas, TX (US)

(72) Inventors: Daniel E. Boss, Morris Township, NJ (US); Denis Muki Tibah, Waxahachie, TX (US); Isaac Bernard Rufus, Newark, DE (US); Adem Chich, Kearny, NJ (US); Overton Williams, Patterson, NJ (US); Wilson Cheung, Hillsborough, NJ (US)

(73) Assignee: BMIC LLC, Dallas, TX (US)

(*) Notice: Subject to any disclaimer, the term of this patent is extended or adjusted under 35 U.S.C. 154(b) by 57 days.

(21) Appl. No.: 16/740,179

(22) Filed: Jan. 10, 2020

(65) Prior Publication Data
US 2020/0224419 A1  Jul. 16, 2020

Related U.S. Application Data

(60) Provisional application No. 62/790,853, filed on Jan. 10, 2019.

(51) Int. Cl.
E04D 1/20 (2006.01)
C08K 3/013 (2018.01)
C08K 5/00 (2006.01)
C09D 123/06 (2006.01)
C09D 123/12 (2006.01)
(Continued)

(52) U.S. Cl.
CPC ............ E04D 1/20 (2013.01); C09D 123/06 (2013.01); C09D 123/12 (2013.01); C09D 123/16 (2013.01); C09D 191/00 (2013.01); E04D 1/22 (2013.01); C08K 3/013 (2018.01);
(Continued)

(58) Field of Classification Search
CPC .... E04D 1/00; E04D 1/26; E04D 5/00; E04D 5/02; E04D 5/06; E04D 5/08; E04D 5/10; E04D 5/12
See application file for complete search history.

(56) References Cited

U.S. PATENT DOCUMENTS 1,218,217 A * 3/1917 Schroder ................. B41M 5/52
                                                              428/489
5,229,197 A    7/1993 Peterson
(Continued)

FOREIGN PATENT DOCUMENTS

WO    2017/035182 A1    3/2017

OTHER PUBLICATIONS

Patterson et al., Handbook of Thermoset Plastics, Chapter 17 Crosslinked Thermoplastics, Elsevier Inc (Year: 2014).*
(Continued)

Primary Examiner — Nathan L Van Sell
(74) Attorney, Agent, or Firm — GREENBERG TRAURIG, LLP

(57) ABSTRACT

This invention, in embodiments, relates to non-asphaltic coatings for roofing materials, to roofing materials made therefrom and to methods of preparing such coatings and roofing materials. By blending thermoplastic polymers with appropriate fillers and/or recycled materials, a composition is produced that can be pressed into a desired shape, or that can be additionally mixed with oils, resins and/or waxes to provide a liquid that can be poured onto an appropriate substrate.

17 Claims, 9 Drawing Sheets

(51) Int. Cl.
*C09D 123/16* (2006.01)
*C09D 191/00* (2006.01)
*E04D 1/22* (2006.01)
*E04D 11/02* (2006.01)

(52) U.S. Cl.
CPC ............ *C08K 5/005* (2013.01); *C08K 5/0066* (2013.01); *E04D 11/02* (2013.01)

(56) References Cited

U.S. PATENT DOCUMENTS

| | | | |
|---|---|---|---|
| 5,510,419 A * | 4/1996 | Burgoyne | C08L 21/00 525/98 |
| 6,228,503 B1 | 5/2001 | Zickell | |
| 6,924,015 B2 | 8/2005 | Zanchetta et al. | |
| 8,197,893 B2 | 6/2012 | Leitch et al. | |
| 8,323,770 B2 | 12/2012 | Mehta et al. | |
| 10,195,640 B2 | 2/2019 | Svec | |
| 2002/0152697 A1 | 10/2002 | Hokkirigawa et al. | |
| 2003/0166760 A1 * | 9/2003 | Taylor | C08L 95/00 524/442 |
| 2004/0224114 A1 * | 11/2004 | Patel | E04D 1/34 428/40.1 |
| 2006/0100335 A1 | 5/2006 | Yalvac et al. | |
| 2007/0277450 A1 | 12/2007 | Raulie | |
| 2009/0018243 A1 | 1/2009 | Bach | |
| 2009/0291249 A1 | 11/2009 | Mehta et al. | |
| 2009/0308009 A1 * | 12/2009 | Boor | C08L 23/10 52/309.13 |
| 2010/0003878 A1 * | 1/2010 | Ahluwalia | C03C 25/47 442/136 |
| 2010/0239816 A1 * | 9/2010 | Kinkade | B29C 70/60 264/129 |
| 2011/0281094 A1 | 11/2011 | Zanchetta et al. | |
| 2012/0164385 A1 * | 6/2012 | Heulings | E04D 1/20 428/144 |
| 2012/0244340 A1 | 9/2012 | Peng et al. | |
| 2013/0202852 A1 * | 8/2013 | Shiao | E04D 1/20 428/145 |
| 2014/0220305 A1 | 8/2014 | Zack | |
| 2015/0018460 A1 | 1/2015 | Guymon et al. | |
| 2015/0105496 A1 | 4/2015 | Naidoo et al. | |
| 2016/0017137 A1 | 1/2016 | Kokuryo et al. | |
| 2017/0058528 A1 | 3/2017 | Verhoff et al. | |
| 2018/0023259 A1 | 1/2018 | Kurth et al. | |
| 2018/0030276 A1 | 2/2018 | De Garavilla et al. | |
| 2018/0187419 A1 * | 7/2018 | Lai | B32B 5/245 |
| 2018/0282588 A1 * | 10/2018 | Arigo | C08J 11/02 |
| 2021/0108416 A1 | 4/2021 | Aschenbeck et al. | |

OTHER PUBLICATIONS

International Search Report dated May 15, 2020, in corresponding PCT Application No. PCT/US20/13197.

* cited by examiner

NON-ASPHALTIC COATINGS, NON-ASPHALTIC ROOFING MATERIALS, AND METHODS OF MAKING THEREOF

RELATED APPLICATION

This application claims the priority of U.S. provisional application Ser. No. U.S. Ser. No. 62/790,853, entitled "Non-Asphaltic Coatings for Roofing Shingles, Shingles Made Therefrom and Methods of Making Shingles" filed Jan. 10, 2019, which is incorporated herein by reference in its entirety for all purposes.

FIELD OF THE INVENTION

This invention relates to non-asphaltic coatings for roofing materials, to roofing materials made therefrom and to methods of preparing such coatings and roofing materials. By blending thermoplastic polymers with appropriate fillers and/or recycled materials, a composition is produced that can be pressed into a desired shape, or that can be additionally mixed with oils, resins and/or waxes to provide a liquid that can be poured onto an appropriate substrate. Roofing materials, such as, e.g., shingles, made by these methods have comparable or superior properties to roofing materials having a traditional asphaltic coating. Using non-asphaltic coating compositions that are based upon thermoplastic polymers and/or recycled materials provides environmental benefits, as well as reducing costs and supply problems associated with asphalt.

BACKGROUND OF THE INVENTION

Traditional roofing materials, such as, e.g., shingles, are based upon a glass or felt mat that is coated and impregnated with an asphalt-based composition that is subsequently coated with granules.

Air blown asphalt and polymer-modified asphalt have been used as roofing shingle coating materials for many years. However, asphalts of suitable quality are becoming less available, and their price is increasing. Also, fluctuations in the quality of asphalt streams can create processing problems and increase operating costs at asphalt processing plants. Moreover, setting up facilities for handling and processing of asphalt-based coating materials can be very costly. These costs are associated with putting in place asphalt and/or additive holding tanks, asphalt heating systems, air blowing stills/compressors, fume incineration systems, mixers and tank agitators and specialized hot liquid loading/unloading stations. The requirement for permits relating to environmental regulations further adds to the overall costs.

There is thus a need for alternative roofing material (e.g., shingle) coatings that are not based upon asphalt, such as coatings that are based upon thermoplastic polymers and/or less expensive and reliably available raw materials (such as recycled materials), and that can be processed on a conventional or standard manufacturing line for asphaltic shingles without the need for additional expensive equipment.

SUMMARY OF THE INVENTION

One embodiment of this invention pertains to a coating comprising (a) 5% to 70% by weight of a thermoplastic polymer and (b) 10% to 70% by weight of a filler, wherein the filler comprises at least one of an organic filler, an inorganic filler, and combinations thereof, wherein the coating is free of asphalt. The coating has a viscosity of 500 to 30,000 centipoise at 375° F. to 400° F. The coating is configured to be a coating for a roofing material.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating has a viscosity of 2,000 to 30,000 centipoise at 375° F. to 400° F. In another embodiment, the coating has a viscosity of 3,000 to 20,000 centipoise at 375° F. to 400° F.

In one embodiment, the coating further comprises 5% to 80% by weight of a recycled material. In one embodiment, the coating further comprises 2% to 10% by weight of a polytransoctenamer rubber (TOR). In one embodiment, the coating further comprises 30% to 80% by weight of an oil, a resin, a wax, or a combination thereof. According to one embodiment, the oil comprises a hydrocarbon oil. In one embodiment, the coating further comprises a dye, a pigment, a fire retardant, a UV stabilizer, or a combination thereof.

Another embodiment of this invention pertains to a coating comprising (a) 5% to 70% by weight of a thermoplastic polymer, (b) 10% to 70% by weight of a filler, wherein the filler comprises at least one of an organic filler, an inorganic filler, and combinations thereof, and (c) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F. The coating is configured to be a coating for a roofing material.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating has a viscosity of 2,000 to 30,000 centipoise at 375° F. to 400° F. In another embodiment, the coating has a viscosity of 3,000 to 20,000 centipoise at 375° F. to 400° F.

In one embodiment, the coating further comprises 5% to 80% by weight of a recycled material. In one embodiment, the coating further comprises 2% to 10% by weight of a polytransoctenamer rubber (TOR). In one embodiment, the coating further comprises 30% to 80% by weight of an oil, a resin, a wax, or a combination thereof. According to one embodiment, the oil comprises a hydrocarbon oil. In one embodiment, the coating further comprises a dye, a pigment, a fire retardant, a UV stabilizer, or a combination thereof.

Another embodiment of this invention pertains to a roofing material that comprises a substrate and a coating applied onto the substrate, with the coating comprising (a) 5% to 70% by weight of a thermoplastic polymer and (b) 10% to 70% by weight of a filler, wherein the filler comprises at least one of an organic filler, an inorganic filler, and combinations thereof, wherein the coating is free of asphalt. The coating has a viscosity of 500 to 30,000 centipoise at 375° F. to 400° F.

In one embodiment, the roofing material is configured to be prepared on a substantially standard manufacturing line for asphaltic shingles at a standard speed of 110 feet per minute (FPM) to 1000 FPM.

In one embodiment, the substrate comprises one of a fiberglass mat, a polyester mat, a scrim, a coated scrim, or a combination thereof.

In one embodiment, the roofing material is a roofing shingle. In one embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

In one embodiment, the roofing material further comprises granules.

In one embodiment, the roofing material exhibits an increased solar reflectance as compared to an asphaltic roofing material.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating further comprises 5% to 80% by weight of a recycled material. In one embodiment, the coating further comprises 30% to 80% by weight of an oil, a resin, a wax, or a combination thereof. In one embodiment, the coating further comprises a dye, a pigment, a fire retardant, a UV stabilizer, or a combination thereof.

Another embodiment of this invention pertains to a roofing material that comprises a substrate and a coating applied onto the substrate, with the coating comprising (a) 5% to 70% by weight of a thermoplastic polymer, (b) 10% to 70% by weight of a filler, wherein the filler comprises at least one of an organic filler, an inorganic filler, and combinations thereof, and (c) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F.

In one embodiment, the roofing material is configured to be prepared on a substantially standard manufacturing line for asphaltic shingles at a standard speed of 110 FPM to 1000 FPM.

In one embodiment, the substrate comprises one of a fiberglass mat, a polyester mat, a scrim, a coated scrim, or a combination thereof.

In one embodiment, the roofing material is a roofing shingle. In one embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

In one embodiment, the roofing material further comprises granules.

In one embodiment, the roofing material exhibits an increased solar reflectance as compared to an asphaltic roofing material.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating further comprises 5% to 80% by weight of a recycled material. In one embodiment, the coating further comprises 30% to 80% by weight of an oil, a resin, a wax, or a combination thereof. In one embodiment, the coating further comprises a dye, a pigment, a fire retardant, a UV stabilizer, or a combination thereof.

Another embodiment of this invention pertains to a method of preparing a roofing material that comprises (a) obtaining a substrate, (b) obtaining a coating comprising (i) 5% to 70% by weight of a thermoplastic polymer, and (ii) 10% to 70% by weight of a filler, wherein the filler comprises at least one of an organic filler, an inorganic mineral filler, and combinations thereof, and (c) applying the coating to a surface of the substrate to form the roofing material, wherein the coating is free of asphalt. The coating has a viscosity of 500 to 30,000 centipoise at 375° F. to 400° F.

In one embodiment, the method further comprises preparing the coating. In one embodiment, the step of preparing the coating is conducted by mixing the thermoplastic polymer with the filler at 300° F. to 425° F. in one of (i) a low shear mixer or (ii) a high shear mixer. In one embodiment, the mixing of the thermoplastic polymer with the filler is conducted without an extruder. In one embodiment, prior to the mixing of the thermoplastic polymer with the filler, the preparation of the coating is further conducted by (i) modifying a base oil of the coating and (ii) adding the thermoplastic polymer and the filler to the modified base oil of the coating. In one embodiment, the step of preparing the coating is conducted under a blanket of an inert gas.

In one embodiment, the step of applying the coating to the surface of the substrate to form the roofing material is conducted on a substantially standard manufacturing line for asphaltic shingles at a standard speed of 110 FPM to 1000 FPM.

In one embodiment, the method further comprises applying granules to the coating.

In one embodiment, the substrate comprises one of a fiberglass mat, a polyester mat, a scrim, a coated scrim, or a combination thereof.

In one embodiment, the roofing material is a roofing shingle. In one embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating further comprises 5% to 80% by weight of a recycled material. In one embodiment, the coating further comprises 30% to 80% by weight of an oil, a resin, a wax, or a combination thereof. In one embodiment, the coating further comprises a dye, a pigment, a fire retardant, a UV stabilizer, or a combination thereof.

Another embodiment of this invention pertains to a method of preparing a roofing material that comprises (a) obtaining a substrate, (b) obtaining a coating comprising (i) 5% to 70% by weight of a thermoplastic polymer, (ii) 10% to 70% by weight of a filler, wherein the filler comprises at least one of an organic filler, an inorganic mineral filler, and combinations thereof, and (iii) 0.1% to 49% by weight of asphalt, wherein the amount of the thermoplastic polymer in the coating is greater than the amount of asphalt in the coating, and (c) applying the coating to a surface of the substrate to form the roofing material. The coating has a viscosity of 500 to 30,000 centipoise at 375° F. to 400° F.

In one embodiment, the method further comprises preparing the coating. In one embodiment, the step of preparing the coating is conducted by mixing the thermoplastic polymer with the filler at 300° F. to 425° F. in one of (i) a low shear mixer or (ii) a high shear mixer. In one embodiment, the mixing of the thermoplastic polymer with the filler is conducted without an extruder. In one embodiment, prior to the mixing of the thermoplastic polymer with the filler, the preparation of the coating is further conducted by (i) modifying a base oil of the coating and (ii) adding the thermoplastic polymer and the filler to the modified base oil of the coating. In one embodiment, the step of preparing the coating is conducted under a blanket of an inert gas.

In one embodiment, the step of applying the coating to the surface of the substrate to form the roofing material is conducted on a substantially standard manufacturing line for asphaltic shingles at a standard speed of 110 FPM to 1000 FPM.

In one embodiment, the method further comprises applying granules to the coating.

In one embodiment, the substrate comprises one of a fiberglass mat, a polyester mat, a scrim, a coated scrim, or a combination thereof.

In one embodiment, the roofing material is a roofing shingle. In one embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

In one embodiment, the thermoplastic polymer includes a polyolefin. In one embodiment, the polyolefin comprises a polypropylene. In one embodiment, the polyolefin comprises a polyethylene. In one embodiment, the polyolefin comprises a copolymer of propylene and ethylene.

In one embodiment, the thermoplastic polymer includes a vinyl polymer. In one embodiment, the vinyl polymer is polyvinyl butyral (PVB).

In one embodiment, the thermoplastic polymer has a Melt Flow Index, in accordance with ISO 1133, of 0.5 g/min to 40 g/min at 190° C./2.16 Kg.

In one embodiment, the filler is at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, and combinations thereof.

In one embodiment, the coating further comprises 5% to 80% by weight of a recycled material. In one embodiment, the coating further comprises 30% to 80% by weight of an oil, a resin, a wax, or a combination thereof. In one embodiment, the coating further comprises a dye, a pigment, a fire retardant, a UV stabilizer, or a combination thereof.

BRIEF DESCRIPTION OF THE FIGURES

For a more complete understanding of the invention and the advantages thereof, reference is made to the following descriptions, taken in conjunction with the accompanying figures, in which.

DETAILED DESCRIPTION

Figure 1:
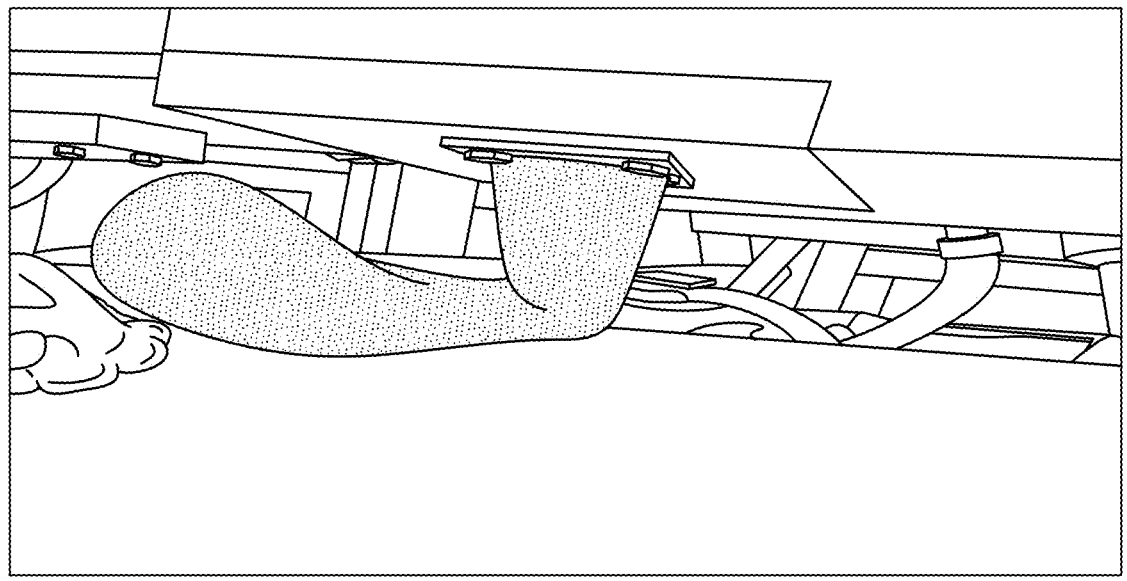
FIGS. 1 & 2 are photographs of shingle coating formulations according to embodiments of the invention before roll pressing.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "free of asphalt" means that the coating does not include any amount of asphalt. In other words, the coating includes 0% by weight of asphalt.

As used herein, the term "solar reflectance" is measured using a Solar Spectrum Reflectometer, which is available from Devices and Services Co., Dallas, TX.

As used herein, the term "viscosity" is measured according to ASTM D 4402.

As used herein, the term "weight percent" or "% by weight" means the percentage by weight of a component based upon a total weight of the coating, coated substrate, emulsion, or suspension, as applicable.

As used herein, the term "roofing material" includes, but is not limited to, shingles, waterproofing membranes, underlayment, and tiles.

In some embodiments of the present invention, the non-asphaltic coatings detailed herein may be applied to other building materials including, but not limited to, siding and flooring.

One embodiment of this invention pertains to a coating for a roofing material. In this embodiment, the coating comprises (a) 5% to 70% by weight of a thermoplastic polymer and (b) 10% to 70% by weight of a filler, wherein the filler comprises at least one of an organic filler, an inorganic filler, and combinations thereof. According to this embodiment, the coating is free of asphalt. The coating has a viscosity of 500 to 30,000 centipoise at 375° F. to 400° F. The coating is configured to be a coating for a roofing material.

Another embodiment of this invention pertains to a coating for a roofing material. In this embodiment, the coating comprises (a) 5% to 70% by weight of a thermoplastic polymer, (b) 10% to 70% by weight of a filler, wherein the filler comprises at least one of an organic filler, an inorganic filler, and combinations thereof, and (c) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F. The coating is configured to be a coating for a roofing material.

One embodiment of this invention pertains to a roofing material that comprises a substrate and a coating applied onto the substrate, with the coating comprising (a) 5% to 70% by weight of a thermoplastic polymer and (b) 10% to 70% by weight of a filler, wherein the filler comprises at least one of an organic filler, an inorganic filler, and combinations thereof. According to this embodiment, the coating is free of asphalt. The coating has a viscosity of 500 to 30,000 centipoise at 375° F. to 400° F.

Another embodiment of this invention pertains to a roofing material that comprises a substrate and a coating applied onto the substrate, with the coating comprises (a) 5% to 70% by weight of a thermoplastic polymer, (b) 10% to 70% by weight of a filler, wherein the filler comprises at least one of an organic filler, an inorganic filler, and combinations thereof, and (c) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F.

One embodiment of this invention pertains to a method of preparing a roofing material that comprises (a) obtaining a substrate, (b) obtaining a coating comprising (i) 5% to 70% by weight of a thermoplastic polymer, and (ii) 10% to 70% by weight of a filler, wherein the filler comprises at least one of an organic filler, an inorganic mineral filler, and combinations thereof, and (c) applying the coating to a surface of the substrate to form the roofing material. According to this embodiment, the coating is free of asphalt. The coating has a viscosity of 500 to 30,000 centipoise at 375° F. to 400° F.

Another embodiment of this invention pertains to a method of preparing a roofing material that comprises (a) obtaining a substrate, (b) obtaining a coating comprising (i) 5% to 70% by weight of a thermoplastic polymer, (ii) 10% to 70% by weight of a filler, wherein the filler comprises at least one of an organic filler, an inorganic filler, and combinations thereof, and (iii) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F.

In an embodiment, the coating comprises one or more thermoplastic polymers. In an embodiment, the thermoplastic polymer includes a polyolefin. In an embodiment, the polyolefin is polyethylene, polypropylene, and/or a copolymer(s) of propylene and ethylene. In an embodiment, the polyolefin comprises a copolymer of ethylene alpha-olefin such as ethylene and octene, ethylene and hexane, and ethylene and butene. In an embodiment, the thermoplastic polymer includes a vinyl polymer (also known as polyvinyl esters). In an embodiment, the vinyl polymer is polyvinyl butyral (PVB). In an embodiment, the thermoplastic polymer is a thermoplastic elastomer.

Non-limiting examples of thermoplastic polymers, polyolefins, vinyl polymers and/or polyvinyl esters, and/or thermoplastic elastomers include, for example, polyethylene (including raw and/or recycled low density polyethylene (LDPE), linear low density polyethylene (LLDPE), and/or high density polyethylene (HDPE)), polypropylenes (e.g., isotactic polypropylene (IPP) and/or atactic polypropylene (APP/IPP)), polystyrene, polyurethane (PU/TPU), polyurea, terpolymers (e.g., a functionalized polymer with a reactive oxygen group), amorphous polyalpha olefins (APAO), amorphous polyolefins (APO), including, e.g., propylene homopolymers and/or copolymers of propylene and ethylene, copolymers of ethylene alpha-olefin, such as ethylene and octene, ethylene and hexane, and ethylene and butene, polyolefin elastomers (POE), styrene/styrenic block copolymers, including, for example, styrenic block copolymers with a hydrogenated midblock of styrene-ethylene/butylene-styrene (SEBS) or styrene-ethylene/propylene-styrene (SEPS), styrene-isoprene-styrene block copolymers (SIS), or styrene-butadiene-styrene block copolymers (SBS), ethylene vinyl acetate (EVA), polyisobutylene, polybutadiene, oxidized polyethylene, epoxy thermoplastics, raw polyvinyl butyral (PVB) and/or recycled polyvinyl butyral (rPVB), polyvinyl acetate (PVAC), poly(vinyl butyrate), poly(vinyl propionate), poly(vinyl formate), copolymers of PVAC such as EVA, and combinations thereof. Such thermoplastic polymers, polyolefins, vinyl polymers and/or polyvinyl esters, and/or thermoplastic elastomers can include, for example, Vistamaxx® 6102 and/or Vistamaxx® 8880, which are polypropylenes (e.g., isotactic polypropylene (IPP)) that are available from ExxonMobil, Irving, TX; Elvaloy®, which is a terpolymer that is available from Dow/DuPont, Wilmington, DE; Fusabond®, which is a chemically modified ethylene acrylate copolymer and/or a modified polyethylene, that is available from Dow/DuPont, Wilmington, DE; RT2304, which is an amorphous polyalpha olefin (APAO) that is available from Rextac APAO Polymers LLC, Odessa, TX; Eastoflex® P1023, which is an amorphous polyolefin (APO) that comprises a propylene homopolymer, and is available from Eastman Chemical Company, Kingsport, TN; Eastoflex® E1060, which is an amorphous polyolefin (APO) that comprises a copolymer of propylene and ethylene, and is available from Eastman Chemical Company, Kingsport, TN; Eastoflex® M1025, which is an amorphous polyolefin (APO) that comprises a blend of propylene homopolymer and copolymers of propylene and ethylene, and is available from Eastman Chemical Company, Kingsport, TN; Engage® 7487, which is a polyolefin elastomer (POE) that is available from Dow Inc., Midland, MI; SEBS 1657, which is a linear triblock copolymer based on styrene and ethylene/butylene, namely, styrene-ethylene/butylene-styrene (SEBS), and is available Kraton Corporation, Houston, TX; SEBS D1191ET, which is a styrene butadiene styrene block copolymer, and is available Kraton Corporation, Houston, TX; PI131350, which is a polyisobutylene that is available from TPC Group, Houston, TX; EBS or ethylene bis stearamide, which is available from ACME-Hardesty Company, Blue Bell, PA; IPP, which is available from Bay Polymer Corp., Fremont, CA; and/or recycled low density polyethylene from Avangard Innovative, Houston, TX.

In an embodiment, PVB is added to the coating in the form of a solid. In another embodiment, PVB is added to the coating as a suspension or emulsion in a liquid. In embodiments, the liquid is water. In an embodiment, the PVB suspension or emulsion is 10% to 90% by weight of PVB. In an embodiment, the PVB suspension or emulsion is 10% to 80% by weight of PVB. In an embodiment, the PVB suspension or emulsion is 10% to 70% by weight of PVB. In an embodiment, the PVB suspension or emulsion is 10% to 60% by weight of PVB. In an embodiment, the PVB suspension or emulsion is 10% to 50% by weight of PVB. In an embodiment, the PVB suspension or emulsion is 10% to 40% by weight of PVB. In an embodiment, the PVB suspension or emulsion is 10% to 30% by weight of PVB. In an embodiment, the PVB suspension or emulsion is 10% to 20% by weight of PVB. In an embodiment, the PVB suspension or emulsion is 20% to 90% by weight of PVB. In an embodiment, the PVB suspension or emulsion is 20% to 80% by weight of PVB. In an embodiment, the PVB suspension or emulsion is 20% to 70% by weight of PVB. In an embodiment, the PVB suspension or emulsion is 20% to 60% by weight of PVB. In an embodiment, the PVB suspension or emulsion is 20% to 50% by weight of PVB. In an embodiment, the PVB suspension or emulsion is 20% to 40% by weight of PVB. In an embodiment, the PVB suspension or emulsion is 20% to 30% by weight of PVB. In an embodiment, the PVB suspension or emulsion is 30% to 90% by weight of PVB. In an embodiment, the PVB suspension or emulsion is 30% to 80% by weight of PVB. In an embodiment, the PVB suspension or emulsion is 30% to 70% by weight of PVB. In an embodiment, the PVB suspension or emulsion is 30% to 60% by weight of PVB. In an embodiment, the PVB suspension or emulsion is 30% to 50% by weight of PVB. In an embodiment, the PVB suspension or emulsion is 30% to 40% by weight of PVB. In an embodiment, the PVB suspension or emulsion is 40% to 90% by weight of PVB. In an embodiment, the PVB suspension or emulsion is 40% to 80% by weight of PVB. In an embodiment, the PVB suspension or emulsion is 40% to 70% by weight of PVB. In an embodiment, the PVB suspension or emulsion is 40% to 60% by weight of PVB. In an embodiment, the PVB suspension or emulsion is 40% to 50% by weight of PVB. In an embodiment, the PVB suspension or emulsion is 50% to 90% by weight of PVB. In an embodiment, the PVB suspension or emulsion is 50% to 80% by weight of PVB. In an embodiment, the PVB suspension or emulsion is 50% to 70% by weight of PVB. In an embodiment, the PVB suspension or emulsion is 50% to 60% by weight of PVB. In an embodiment, the PVB suspension or emulsion is 60% to 90% by weight of PVB. In an embodiment, the PVB suspension or emulsion is 60% to 80% by weight of PVB. In an embodiment, the PVB suspension or emulsion is 60% to 70% by weight of PVB. In an embodiment, the PVB suspension or emulsion is 70% to 90% by weight of PVB. In an embodiment, the PVB suspension or emulsion is 70% to 80% by weight of PVB. In an embodiment, the PVB suspension or emulsion is 80% to 90% by weight of PVB. Non-limiting examples of PVB include recycled PVB from Dlubak Specialty Glass Corporation, Blairsville, PA; and recycled PVB SharkPellets C2c and/or SharkPellets C4c from Shark Solutions, Roskilde, Denmark.

In an embodiment, the thermoplastic polymer has a Melt Flow Index at 190° C./2.16 Kg of 0.5 g/min to 40 g/min in accordance with ISO 1133. In an embodiment, the thermoplastic polymer has a Melt Flow Index at 190° C./2.16 Kg of 1 g/min to 40 g/min in accordance with ISO 1133. In an embodiment, the thermoplastic polymer has a Melt Flow Index at 190° C./2.16 Kg of 5 g/min to 40 g/min in accordance with ISO 1133. In an embodiment, the thermoplastic polymer has a Melt Flow Index at 190° C./2.16 Kg of 10 g/min to 40 g/min in accordance with ISO 1133. In an embodiment, the thermoplastic polymer has a Melt Flow Index at 190° C./2.16 Kg of 20 g/min to 40 g/min in accordance with ISO 1133. In an embodiment, the thermoplastic polymer has a Melt Flow Index at 190° C./2.16 Kg of 30 g/min to 40 g/min in accordance with ISO 1133. In an embodiment, the thermoplastic polymer has a Melt Flow Index at 190° C./2.16 Kg of 0.5 g/min to 30 g/min in accordance with ISO 1133. In an embodiment, the thermoplastic polymer has a Melt Flow Index at 190° C./2.16 Kg of 1 g/min to 30 g/min in accordance with ISO 1133. In an embodiment, the thermoplastic polymer has a Melt Flow Index at 190° C./2.16 Kg of 5 g/min to 30 g/min in accordance with ISO 1133. In an embodiment, the thermoplastic polymer has a Melt Flow Index at 190° C./2.16 Kg of 10 g/min to 30 g/min in accordance with ISO 1133. In an embodiment, the thermoplastic polymer has a Melt Flow Index at 190° C./2.16 Kg of 20 g/min to 30 g/min in accordance with ISO 1133. In an embodiment, the thermoplastic polymer has a Melt Flow Index at 190° C./2.16 Kg of 0.5 g/min to 20 g/min in accordance with ISO 1133. In an embodiment, the thermoplastic polymer has a Melt Flow Index at 190° C./2.16 Kg of 1 g/min to 20 g/min in accordance with ISO 1133. In an embodiment, the thermoplastic polymer has a Melt Flow Index at 190° C./2.16 Kg of 5 g/min to 20 g/min in accordance with ISO 1133. In an embodiment, the thermoplastic polymer has a Melt Flow Index at 190° C./2.16 Kg of 10 g/min to 20 g/min in accordance with ISO 1133. In an embodiment, the thermoplastic polymer has a Melt Flow Index at 190° C./2.16 Kg of 0.5 g/min to 10 g/min in accordance with ISO 1133. In an embodiment, the thermoplastic polymer has a Melt Flow Index at 190° C./2.16 Kg of 1 g/min to 10 g/min in accordance with ISO 1133. In an embodiment, the thermoplastic polymer has a Melt Flow Index at 190° C./2.16 Kg of 5 g/min to 10 g/min in accordance with ISO 1133. In an embodiment, the thermoplastic polymer has a Melt Flow Index at 190° C./2.16 Kg of 0.5 g/min to 5 g/min in accordance with ISO 1133. In an embodiment, the thermoplastic polymer has a Melt Flow Index at 190° C./2.16 Kg of 1 g/min to 5 g/min in accordance with ISO 1133. In an embodiment, the thermoplastic polymer has a Melt Flow Index at 190° C./2.16 Kg of 0.5 g/min to 1 g/min in accordance with ISO 1133. In an embodiment, the thermoplastic polymer has a Melt Flow Index at 190° C./2.16 Kg of less than 0.5 g/min in accordance with ISO 1133.

In an embodiment, the thermoplastic polymer has a Melt Flow Index at 190° C./2.16 Kg of 0.5 g/10 min to 1000 g/10 min in accordance with ISO 1133. In an embodiment, the thermoplastic polymer has a Melt Flow Index at 190° C./2.16 Kg of 1 g/10 min to 1000 g/10 min in accordance with ISO 1133. In an embodiment, the thermoplastic polymer has a Melt Flow Index at 190° C./2.16 Kg of 5 g/10 min to 1000 g/10 min in accordance with ISO 1133. In an embodiment, the thermoplastic polymer has a Melt Flow Index at 190° C./2.16 Kg of 10 g/10 min to 1000 g/10 min in accordance with ISO 1133. In an embodiment, the thermoplastic polymer has a Melt Flow Index at 190° C./2.16 Kg of 25 g/10 min to 1000 g/10 min in accordance with ISO 1133. In an embodiment, the thermoplastic polymer has a Melt Flow Index at 190° C./2.16 Kg of 50 g/10 min to 1000 g/10 min in accordance with ISO 1133. In an embodiment, the thermoplastic polymer has a Melt Flow Index at 190° C./2.16 Kg of 100 g/10 min to 1000 g/10 min in accordance with ISO 1133. In an embodiment, the thermoplastic polymer has a Melt Flow Index at 190° C./2.16 Kg of 200 g/10 min to 1000 g/10 min in accordance with ISO 1133. In an embodiment, the thermoplastic polymer has a Melt Flow Index at 190° C./2.16 Kg of 300 g/10 min to 1000 g/10 min in accordance with ISO 1133. In an embodiment, the thermoplastic polymer has a Melt Flow Index at 190° C./2.16 Kg of 400 g/10 min to 1000 g/10 min in accordance with ISO 1133. In an embodiment, the thermoplastic polymer has a Melt Flow Index at 190° C./2.16 Kg of 500 g/10 min to 1000 g/10 min in accordance with ISO 1133. In an embodiment, the thermoplastic polymer has a Melt Flow Index at 190° C./2.16 Kg of 600 g/10 min to 1000 g/10 min in accordance with ISO 1133. In an embodiment, the thermoplastic polymer has a Melt Flow Index at 190° C./2.16 Kg of 700 g/10 min to 1000 g/10 min in accordance with ISO 1133. In an embodiment, the thermoplastic polymer has a Melt Flow Index at 190° C./2.16 Kg of 800 g/10 min to 1000 g/10 min in accordance with ISO 1133. In an embodiment, the thermoplastic polymer has a Melt Flow Index at 190° C./2.16 Kg of 900 g/10 min to 1000 g/10 min in accordance with ISO 1133. In an embodiment, the thermoplastic polymer has a Melt Flow Index at 190° C./2.16 Kg of 0.5 g/10 min to 800 g/10 min in accordance with ISO 1133. In an embodiment, the thermoplastic polymer has a Melt Flow Index at 190° C./2.16 Kg of 1 g/10 min to 800 g/10 min in accordance with ISO 1133. In an embodiment, the thermoplastic polymer has a Melt Flow Index at 190° C./2.16 Kg of 5 g/10 min to 800 g/10 min in accordance with ISO 1133. In an embodiment, the thermoplastic polymer has a Melt Flow Index at 190° C./2.16 Kg of 10 g/10 min to 800 g/10 min in accordance with ISO 1133. In an embodiment, the thermoplastic polymer has a Melt Flow Index at 190° C./2.16 Kg of 25 g/10 min to 800 g/10 min in accordance with ISO 1133. In an embodiment, the thermoplastic polymer has a Melt Flow Index at 190° C./2.16 Kg of 50 g/10 min to 800 g/10 min in accordance with ISO 1133. In an embodiment, the thermoplastic polymer has a Melt Flow Index at 190° C./2.16 Kg of 100 g/10 min to 800 g/10 min in accordance with ISO 1133. In an embodiment, the thermoplastic polymer has a Melt Flow Index at 190° C./2.16 Kg of 200 g/10 min to 800 g/10 min in accordance with ISO 1133. In an embodiment, the thermoplastic polymer has a Melt Flow Index at 190° C./2.16 Kg of 300 g/10 min to 800 g/10 min in accordance with ISO 1133. In an embodiment, the thermoplastic polymer has a Melt Flow Index at 190° C./2.16 Kg of 400 g/10 min to 800 g/10 min in accordance with ISO 1133. In an embodiment, the thermoplastic polymer has a Melt Flow Index at 190° C./2.16 Kg of 500 g/10 min to 800 g/10 min in accordance with ISO 1133. In an embodiment, the thermoplastic polymer has a Melt Flow Index at 190° C./2.16 Kg of 600 g/10 min to 800 g/10 min in accordance with ISO 1133. In an embodiment, the thermoplastic polymer has a Melt Flow Index at 190° C./2.16 Kg of 700 g/10 min to 800 g/10 min in accordance with ISO 1133. In an embodiment, the thermoplastic polymer has a Melt Flow Index at 190° C./2.16 Kg of 0.5 g/10 min to 600 g/10 min in accordance with ISO 1133. In an embodiment, the thermoplastic polymer has a Melt Flow Index at 190° C./2.16 Kg of 1 g/10 min to 600 g/10 min in accordance with ISO 1133. In an embodiment, the thermoplastic polymer has a Melt Flow Index at 190° C./2.16 Kg of 5 g/10 min to 600 g/10 min in accordance with ISO 1133. In an embodiment, the thermoplastic polymer has a Melt Flow Index at 190° C./2.16 Kg of 10 g/10 min to 600 g/10 min in accordance with ISO 1133. In an embodiment, the thermoplastic polymer has a Melt Flow Index at 190° C./2.16 Kg of 25 g/10 min to 600 g/10 min in accordance with ISO 1133. In an embodiment, the thermoplastic polymer has a Melt Flow Index at 190° C./2.16 Kg of 50 g/10 min to 600 g/10 min in accordance with ISO 1133. In an embodiment, the thermoplastic polymer has a Melt Flow Index at 190° C./2.16 Kg of 100 g/10 min to 600 g/10 min in accordance with ISO 1133. In an embodiment, the thermoplastic polymer has a Melt Flow Index at 190° C./2.16 Kg of 200 g/10 min to 600 g/10 min in accordance with ISO 1133. In an embodiment, the thermoplastic polymer has a Melt Flow Index at 190° C./2.16 Kg of 300 g/10 min to 600 g/10 min in accordance with ISO 1133. In an embodiment, the thermoplastic polymer has a Melt Flow Index at 190° C./2.16 Kg of 400 g/10 min to 600 g/10 min in accordance with ISO 1133. In an embodiment, the thermoplastic polymer has a Melt Flow Index at 190° C./2.16 Kg of 500 g/10 min to 600 g/10 min in accordance with ISO 1133. In an embodiment, the thermoplastic polymer has a Melt Flow Index at 190° C./2.16 Kg of 0.5 g/10 min to 400 g/10 min in accordance with ISO 1133. In an embodiment, the thermoplastic polymer has a Melt Flow Index at 190° C./2.16 Kg of 1 g/10 min to 400 g/10 min in accordance with ISO 1133. In an embodiment, the thermoplastic polymer has a Melt Flow Index at 190° C./2.16 Kg of 5 g/10 min to 400 g/10 min in accordance with ISO 1133. In an embodiment, the thermoplastic polymer has a Melt Flow Index at 190° C./2.16 Kg of 10 g/10 min to 400 g/10 min in accordance with ISO 1133. In an embodiment, the thermoplastic polymer has a Melt Flow Index at 190° C./2.16 Kg of 25 g/10 min to 400 g/10 min in accordance with ISO 1133. In an embodiment, the thermoplastic polymer has a Melt Flow Index at 190° C./2.16 Kg of 50 g/10 min to 400 g/10 min in accordance with ISO 1133. In an embodiment, the thermoplastic polymer has a Melt Flow Index at 190° C./2.16 Kg of 100 g/10 min to 400 g/10 min in accordance with ISO 1133. In an embodiment, the thermoplastic polymer has a Melt Flow Index at 190° C./2.16 Kg of 200 g/10 min to 400 g/10 min in accordance with ISO 1133. In an embodiment, the thermoplastic polymer has a Melt Flow Index at 190° C./2.16 Kg of 300 g/10 min to 400 g/10 min in accordance with ISO 1133. In an embodiment, the thermoplastic polymer has a Melt Flow Index at 190° C./2.16 Kg of 0.5 g/10 min to 200 g/10 min in accordance with ISO 1133. In an embodiment, the thermoplastic polymer has a Melt Flow Index at 190° C./2.16 Kg of 1 g/10 min to 200 g/10 min in accordance with ISO 1133. In an embodiment, the thermoplastic polymer has a Melt Flow Index at 190° C./2.16 Kg of 5 g/10 min to 200 g/10 min in accordance with ISO 1133. In an embodiment, the thermoplastic polymer has a Melt Flow Index at 190° C./2.16 Kg of 10 g/10 min to 200 g/10 min in accordance with ISO 1133. In an embodiment, the thermoplastic polymer has a Melt Flow Index at 190° C./2.16 Kg of 25 g/10 min to 200 g/10 min in accordance with ISO 1133. In an embodiment, the thermoplastic polymer has a Melt Flow Index at 190° C./2.16 Kg of 50 g/10 min to 200 g/10 min in accordance with ISO 1133. In an embodiment, the thermoplastic polymer has a Melt Flow Index at 190° C./2.16 Kg of 100 g/10 min to 200 g/10 min in accordance with ISO 1133. In an embodiment, the thermoplastic polymer has a Melt Flow Index at 190° C./2.16 Kg of 0.5 g/10 min to 100 g/10 min in accordance with ISO 1133. In an embodiment, the thermoplastic polymer has a Melt Flow Index at 190° C./2.16 Kg of 1 g/10 min to 100 g/10 min in accordance with ISO 1133. In an embodiment, the thermoplastic polymer has a Melt Flow Index at 190° C./2.16 Kg of 5 g/10 min to 100 g/10 min in accordance with ISO 1133. In an embodiment, the thermoplastic polymer has a Melt Flow Index at 190° C./2.16 Kg of 10 g/10 min to 100 g/10 min in accordance with ISO 1133. In an embodiment, the thermoplastic polymer has a Melt Flow Index at 190° C./2.16 Kg of 25 g/10 min to 100 g/10 min in accordance with ISO 1133. In an embodiment, the thermoplastic polymer has a Melt Flow Index at 190° C./2.16 Kg of 50 g/10 min to 100 g/10 min in accordance with ISO 1133. In an embodiment, the thermoplastic polymer has a Melt Flow Index at 190° C./2.16 Kg of 0.5 g/10 min to 50 g/10 min in accordance with ISO 1133. In an embodiment, the thermoplastic polymer has a Melt Flow Index at 190° C./2.16 Kg of 1 g/10 min to 50 g/10 min in accordance with ISO 1133. In an embodiment, the thermoplastic polymer has a Melt Flow Index at 190° C./2.16 Kg of 5 g/10 min to 50 g/10 min in accordance with ISO 1133. In an embodiment, the thermoplastic polymer has a Melt Flow Index at 190° C./2.16 Kg of 10 g/10 min to 50 g/10 min in accordance with ISO 1133. In an embodiment, the thermoplastic polymer has a Melt Flow Index at 190° C./2.16 Kg of 25 g/10 min to 50 g/10 min in accordance with ISO 1133. In an embodiment, the thermoplastic polymer has a Melt Flow Index at 190° C./2.16 Kg of 0.5 g/10 min to 25 g/10 min in accordance with ISO 1133. In an embodiment, the thermoplastic polymer has a Melt Flow Index at 190° C./2.16 Kg of 1 g/10 min to 25 g/10 min in accordance with ISO 1133. In an embodiment, the thermoplastic polymer has a Melt Flow Index at 190° C./2.16 Kg of 5 g/10 min to 25 g/10 min in accordance with ISO 1133. In an embodiment, the thermoplastic polymer has a Melt Flow Index at 190° C./2.16 Kg of 10 g/10 min to 25 g/10 min in accordance with ISO 1133. In an embodiment, the thermoplastic polymer has a Melt Flow Index at 190° C./2.16 Kg of 0.5 g/10 min to 10 g/10 min in accordance with ISO 1133. In an embodiment, the thermoplastic polymer has a Melt Flow Index at 190° C./2.16 Kg of 1 g/10 min to 10 g/10 min in accordance with ISO 1133. In an embodiment, the thermoplastic polymer has a Melt Flow Index at 190° C./2.16 Kg of 5 g/10 min to 10 g/10 min in accordance with ISO 1133.

In an embodiment, the thermoplastic polymer has a Melt Flow Index at 230° C./2.16 Kg of 0.5 g/10 min to 25,000 g/10 min in accordance with ISO 1133. In an embodiment, the thermoplastic polymer has a Melt Flow Index at 230° C./2.16 Kg of 1 g/10 min to 25,000 g/10 min in accordance with ISO 1133. In an embodiment, the thermoplastic polymer has a Melt Flow Index at 230° C./2.16 Kg of 5 g/10 min to 25,000 g/10 min in accordance with ISO 1133. In an embodiment, the thermoplastic polymer has a Melt Flow Index at 230° C./2.16 Kg of 10 g/10 min to 25,000 g/10 min in accordance with ISO 1133. In an embodiment, the thermoplastic polymer has a Melt Flow Index at 230° C./2.16 Kg of 25 g/10 min to 25,000 g/10 min in accordance with ISO 1133. In an embodiment, the thermoplastic polymer has a Melt Flow Index at 230° C./2.16 Kg of 50 g/10 min to 25,000 g/10 min in accordance with ISO 1133. In an embodiment, the thermoplastic polymer has a Melt Flow Index at 230° C./2.16 Kg of 100 g/10 min to 25,000 g/10 min in accordance with ISO 1133. In an embodiment, the thermoplastic polymer has a Melt Flow Index at 230° C./2.16 Kg of 250 g/10 min to 25,000 g/10 min in accordance with ISO 1133. In an embodiment, the thermoplastic polymer has a Melt Flow Index at 230° C./2.16 Kg of 500 g/10 min to 25,000 g/10 min in accordance with ISO 1133. In an embodiment, the thermoplastic polymer has a Melt Flow Index at 230° C./2.16 Kg of 1000 g/10 min to 25,000 g/10 min in accordance with ISO 1133. In an embodiment, the thermoplastic polymer has a Melt Flow Index at 230° C./2.16 Kg of 2500 g/10 min to 25,000 g/10 min in accordance with ISO 1133. In an embodiment, the thermoplastic polymer has a Melt Flow Index at 230° C./2.16 Kg of 5000 g/10 min to 25,000 g/10 min in accordance with ISO 1133. In an embodiment, the thermoplastic polymer has a Melt Flow Index at 230° C./2.16 Kg of 10,000 g/10 min to 25,000 g/10 min in accordance with ISO 1133. In an embodiment, the thermoplastic polymer has a Melt Flow Index at 230° C./2.16 Kg of 15,000 g/10 min to 25,000 g/10 min in accordance with ISO 1133. In an embodiment, the thermoplastic polymer has a Melt Flow Index at 230° C./2.16 Kg of 20,000 g/10 min to 25,000 g/10 min in accordance with ISO 1133. In an embodiment, the thermoplastic polymer has a Melt Flow Index at 230° C./2.16 Kg of 0.5 g/10 min to 20,000 g/10 min in accordance with ISO 1133. In an embodiment, the thermoplastic polymer has a Melt Flow Index at 230° C./2.16 Kg of 1 g/10 min to 20,000 g/10 min in accordance with ISO 1133. In an embodiment, the thermoplastic polymer has a Melt Flow Index at 230° C./2.16 Kg of 5 g/10 min to 20,000 g/10 min in accordance with ISO 1133. In an embodiment, the thermoplastic polymer has a Melt Flow Index at 230° C./2.16 Kg of 10 g/10 min to 20,000 g/10 min in accordance with ISO 1133. In an embodiment, the thermoplastic polymer has a Melt Flow Index at 230° C./2.16 Kg of 25 g/10 min to 20,000 g/10 min in accordance with ISO 1133. In an embodiment, the thermoplastic polymer has a Melt Flow Index at 230° C./2.16 Kg of 50 g/10 min to 20,000 g/10 min in accordance with ISO 1133. In an embodiment, the thermoplastic polymer has a Melt Flow Index at 230° C./2.16 Kg of 100 g/10 min to 20,000 g/10 min in accordance with ISO 1133. In an embodiment, the thermoplastic polymer has a Melt Flow Index at 230° C./2.16 Kg of 250 g/10 min to 20,000 g/10 min in accordance with ISO 1133. In an embodiment, the thermoplastic polymer has a Melt Flow Index at 230° C./2.16 Kg of 500 g/10 min to 20,000 g/10 min in accordance with ISO 1133. In an embodiment, the thermoplastic polymer has a Melt Flow Index at 230° C./2.16 Kg of 1000 g/10 min to 20,000 g/10 min in accordance with ISO 1133. In an embodiment, the thermoplastic polymer has a Melt Flow Index at 230° C./2.16 Kg of 2500 g/10 min to 20,000 g/10 min in accordance with ISO 1133. In an embodiment, the thermoplastic polymer has a Melt Flow Index at 230° C./2.16 Kg of 5000 g/10 min to 20,000 g/10 min in accordance with ISO 1133. In an embodiment, the thermoplastic polymer has a Melt Flow Index at 230° C./2.16 Kg of 10,000 g/10 min to 20,000 g/10 min in accordance with ISO 1133. In an embodiment, the thermoplastic polymer has a Melt Flow Index at 230° C./2.16 Kg of 15,000 g/10 min to 20,000 g/10 min in accordance with ISO 1133. In an embodiment, the thermoplastic polymer has a Melt Flow Index at 230° C./2.16 Kg of 0.5 g/10 min to 10,000 g/10 min in accordance with ISO 1133. In an embodiment, the thermoplastic polymer has a Melt Flow Index at 230° C./2.16 Kg of 1 g/10 min to 10,000 g/10 min in accordance with ISO 1133. In an embodiment, the thermoplastic polymer has a Melt Flow Index at 230° C./2.16 Kg of 5 g/10 min to 10,000 g/10 min in accordance with ISO 1133. In an embodiment, the thermoplastic polymer has a Melt Flow Index at 230° C./2.16 Kg of 10 g/10 min to 10,000 g/10 min in accordance with ISO 1133. In an embodiment, the thermoplastic polymer has a Melt Flow Index at 230° C./2.16 Kg of 25 g/10 min to 10,000 g/10 min in accordance with ISO 1133. In an embodiment, the thermoplastic polymer has a Melt Flow Index at 230° C./2.16 Kg of 50 g/10 min to 10,000 g/10 min in accordance with ISO 1133. In an embodiment, the thermoplastic polymer has a Melt Flow Index at 230° C./2.16 Kg of 100 g/10 min to 10,000 g/10 min in accordance with ISO 1133. In an embodiment, the thermoplastic polymer has a Melt Flow Index at 230° C./2.16 Kg of 250 g/10 min to 10,000 g/10 min in accordance with ISO 1133. In an embodiment, the thermoplastic polymer has a Melt Flow Index at 230° C./2.16 Kg of 500 g/10 min to 10,000 g/10 min in accordance with ISO 1133. In an embodiment, the thermoplastic polymer has a Melt Flow Index at 230° C./2.16 Kg of 1000 g/10 min to 10,000 g/10 min in accordance with ISO 1133. In an embodiment, the thermoplastic polymer has a Melt Flow Index at 230° C./2.16 Kg of 2500 g/10 min to 10,000 g/10 min in accordance with ISO 1133. In an embodiment, the thermoplastic polymer has a Melt Flow Index at 230° C./2.16 Kg of 5000 g/10 min to 10,000 g/10 min in accordance with ISO 1133. In an embodiment, the thermoplastic polymer has a Melt Flow Index at 230° C./2.16 Kg of 0.5 g/10 min to 5,000 g/10 min in accordance with ISO 1133. In an embodiment, the thermoplastic polymer has a Melt Flow Index at 230° C./2.16 Kg of 1 g/10 min to 5,000 g/10 min in accordance with ISO 1133. In an embodiment, the thermoplastic polymer has a Melt Flow Index at 230° C./2.16 Kg of 5 g/10 min to 5,000 g/10 min in accordance with ISO 1133. In an embodiment, the thermoplastic polymer has a Melt Flow Index at 230° C./2.16 Kg of 10 g/10 min to 5,000 g/10 min in accordance with ISO 1133. In an embodiment, the thermoplastic polymer has a Melt Flow Index at 230° C./2.16 Kg of 25 g/10 min to 5,000 g/10 min in accordance with ISO 1133. In an embodiment, the thermoplastic polymer has a Melt Flow Index at 230° C./2.16 Kg of 50 g/10 min to 5,000 g/10 min in accordance with ISO 1133. In an embodiment, the thermoplastic polymer has a Melt Flow Index at 230° C./2.16 Kg of 100 g/10 min to 5,000 g/10 min in accordance with ISO 1133. In an embodiment, the thermoplastic polymer has a Melt Flow Index at 230° C./2.16 Kg of 250 g/10 min to 5,000 g/10 min in accordance with ISO 1133. In an embodiment, the thermoplastic polymer has a Melt Flow Index at 230° C./2.16 Kg of 500 g/10 min to 5,000 g/10 min in accordance with ISO 1133. In an embodiment, the thermoplastic polymer has a Melt Flow Index at 230° C./2.16 Kg of 1000 g/10 min to 5,000 g/10 min in accordance with ISO 1133. In an embodiment, the thermoplastic polymer has a Melt Flow Index at 230° C./2.16 Kg of 2500 g/10 min to 5,000 g/10 min in accordance with ISO 1133. In an embodiment, the thermoplastic polymer has a Melt Flow Index at 230° C./2.16 Kg of 0.5 g/10 min to 1,000 g/10 min in accordance with ISO 1133. In an embodiment, the thermoplastic polymer has a Melt Flow Index at 230° C./2.16 Kg of 1 g/10 min to 1,000 g/10 min in accordance with ISO 1133. In an embodiment, the thermoplastic polymer has a Melt Flow Index at 230° C./2.16 Kg of 5 g/10 min to 1,000 g/10 min in accordance with ISO 1133. In an embodiment, the thermoplastic polymer has a Melt Flow Index at 230° C./2.16 Kg of 10 g/10 min to 1,000 g/10 min in accordance with ISO 1133. In an embodiment, the thermoplastic polymer has a Melt Flow Index at 230° C./2.16 Kg of 25 g/10 min to 1,000 g/10 min in accordance with ISO 1133. In an embodiment, the thermoplastic polymer has a Melt Flow Index at 230° C./2.16 Kg of 50 g/10 min to 1,000 g/10 min in accordance with ISO 1133. In an embodiment, the thermoplastic polymer has a Melt Flow Index at 230° C./2.16 Kg of 100 g/10 min to 1,000 g/10 min in accordance with ISO 1133. In an embodiment, the thermoplastic polymer has a Melt Flow Index at 230° C./2.16 Kg of 250 g/10 min to 1,000 g/10 min in accordance with ISO 1133. In an embodiment, the thermoplastic polymer has a Melt Flow Index at 230° C./2.16 Kg of 500 g/10 min to 1,000 g/10 min in accordance with ISO 1133. In an embodiment, the thermoplastic polymer has a Melt Flow Index at 230° C./2.16 Kg of 0.5 g/10 min to 500 g/10 min in accordance with ISO 1133. In an embodiment, the thermoplastic polymer has a Melt Flow Index at 230° C./2.16 Kg of 1 g/10 min to 500 g/10 min in accordance with ISO 1133. In an embodiment, the thermoplastic polymer has a Melt Flow Index at 230° C./2.16 Kg of 5 g/10 min to 500 g/10 min in accordance with ISO 1133. In an embodiment, the thermoplastic polymer has a Melt Flow Index at 230° C./2.16 Kg of 10 g/10 min to 500 g/10 min in accordance with ISO 1133. In an embodiment, the thermoplastic polymer has a Melt Flow Index at 230° C./2.16 Kg of 25 g/10 min to 500 g/10 min in accordance with ISO 1133. In an embodiment, the thermoplastic polymer has a Melt Flow Index at 230° C./2.16 Kg of 50 g/10 min to 500 g/10 min in accordance with ISO 1133. In an embodiment, the thermoplastic polymer has a Melt Flow Index at 230° C./2.16 Kg of 100 g/10 min to 500 g/10 min in accordance with ISO 1133. In an embodiment, the thermoplastic polymer has a Melt Flow Index at 230° C./2.16 Kg of 250 g/10 min to 500 g/10 min in accordance with ISO 1133. In an embodiment, the thermoplastic polymer has a Melt Flow Index at 230° C./2.16 Kg of 0.5 g/10 min to 100 g/10 min in accordance with ISO 1133. In an embodiment, the thermoplastic polymer has a Melt Flow Index at 230° C./2.16 Kg of 1 g/10 min to 100 g/10 min in accordance with ISO 1133. In an embodiment, the thermoplastic polymer has a Melt Flow Index at 230° C./2.16 Kg of 5 g/10 min to 100 g/10 min in accordance with ISO 1133. In an embodiment, the thermoplastic polymer has a Melt Flow Index at 230° C./2.16 Kg of 10 g/10 min to 100 g/10 min in accordance with ISO 1133. In an embodiment, the thermoplastic polymer has a Melt Flow Index at 230° C./2.16 Kg of 25 g/10 min to 100 g/10 min in accordance with ISO 1133. In an embodiment, the thermoplastic polymer has a Melt Flow Index at 230° C./2.16 Kg of 50 g/10 min to 100 g/10 min in accordance with ISO 1133.

In an embodiment, the coating comprises 5% to 80% by weight of thermoplastic polymer. In an embodiment, the coating comprises 8% to 80% by weight of thermoplastic polymer. In an embodiment, the coating comprises 10% to 80% by weight of thermoplastic polymer. In an embodiment, the coating comprises 15% to 80% by weight of thermoplastic polymer. In an embodiment, the coating comprises 20% to 80% by weight of thermoplastic polymer. In an embodiment, the coating comprises 25% to 80% by weight of thermoplastic polymer. In an embodiment, the coating comprises 30% to 80% by weight of thermoplastic polymer. In an embodiment, the coating comprises 40% to 80% by weight of thermoplastic polymer. In an embodiment, the coating comprises 50% to 80% by weight of thermoplastic polymer. In an embodiment, the coating comprises 60% to 80% by weight of thermoplastic polymer. In an embodiment, the coating comprises 70% to 80% by weight of thermoplastic polymer. In an embodiment, the coating comprises 5% to 70% by weight of thermoplastic polymer. In an embodiment, the coating comprises 8% to 70% by weight of thermoplastic polymer. In an embodiment, the coating comprises 10% to 70% by weight of thermoplastic polymer. In an embodiment, the coating comprises 15% to 70% by weight of thermoplastic polymer. In an embodiment, the coating comprises 20% to 70% by weight of thermoplastic polymer. In an embodiment, the coating comprises 25% to 70% by weight of thermoplastic polymer. In an embodiment, the coating comprises 30% to 70% by weight of thermoplastic polymer. In an embodiment, the coating comprises 40% to 70% by weight of thermoplastic polymer. In an embodiment, the coating comprises 50% to 70% by weight of thermoplastic polymer. In an embodiment, the coating comprises 60% to 70% by weight of thermoplastic polymer. In an embodiment, the coating comprises 5% to 60% by weight of thermoplastic polymer. In an embodiment, the coating comprises 8% to 60% by weight of thermoplastic polymer. In an embodiment, the coating comprises 10% to 60% by weight of thermoplastic polymer. In an embodiment, the coating comprises 15% to 60% by weight of thermoplastic polymer. In an embodiment, the coating comprises 20% to 60% by weight of thermoplastic polymer. In an embodiment, the coating comprises 25% to 60% by weight of thermoplastic polymer. In an embodiment, the coating comprises 30% to 60% by weight of thermoplastic polymer. In an embodiment, the coating comprises 40% to 60% by weight of thermoplastic polymer. In an embodiment, the coating comprises 50% to 60% by weight of thermoplastic polymer. In an embodiment, the coating comprises 5% to 50% by weight of thermoplastic polymer. In an embodiment, the coating comprises 8% to 50% by weight of thermoplastic polymer. In an embodiment, the coating comprises 10% to 50% by weight of thermoplastic polymer. In an embodiment, the coating comprises 15% to 50% by weight of thermoplastic polymer. In an embodiment, the coating comprises 20% to 50% by weight of thermoplastic polymer. In an embodiment, the coating comprises 25% to 50% by weight of thermoplastic polymer. In an embodiment, the coating comprises 30% to 50% by weight of thermoplastic polymer. In an embodiment, the coating comprises 40% to 50% by weight of thermoplastic polymer. In an embodiment, the coating comprises 5% to 40% by weight of thermoplastic polymer. In an embodiment, the coating comprises 8% to 40% by weight of thermoplastic polymer. In an embodiment, the coating comprises 10% to 40% by weight of thermoplastic polymer. In an embodiment, the coating comprises 15% to 40% by weight of thermoplastic polymer. In an embodiment, the coating comprises 20% to 40% by weight of thermoplastic polymer. In an embodiment, the coating comprises 25% to 40% by weight of thermoplastic polymer. In an embodiment, the coating comprises 30% to 40% by weight of thermoplastic polymer. In an embodiment, the coating comprises 5% to 30% by weight of thermoplastic polymer. In an embodiment, the coating comprises 8% to 30% by weight of thermoplastic polymer. In an embodiment, the coating comprises 10% to 30% by weight of thermoplastic polymer. In an embodiment, the coating comprises 15% to 30% by weight of thermoplastic polymer. In an embodiment, the coating comprises 20% to 30% by weight of thermoplastic polymer. In an embodiment, the coating comprises 25% to 30% by weight of thermoplastic polymer. In an embodiment, the coating comprises 5% to 25% by weight of thermoplastic polymer. In an embodiment, the coating comprises 8% to 25% by weight of thermoplastic polymer. In an embodiment, the coating comprises 10% to 25% by weight of thermoplastic polymer. In an embodiment, the coating comprises 15% to 25% by weight of thermoplastic polymer. In an embodiment, the coating comprises 20% to 25% by weight of thermoplastic polymer. In an embodiment, the coating comprises 5% to 20% by weight of thermoplastic polymer. In an embodiment, the coating comprises 8% to 20% by weight of thermoplastic polymer. In an embodiment, the coating comprises 10% to 20% by weight of thermoplastic polymer. In an embodiment, the coating comprises 15% to 20% by weight of thermoplastic polymer. In an embodiment, the coating comprises 5% to 15% by weight of thermoplastic polymer. In an embodiment, the coating comprises 8% to 15% by weight of thermoplastic polymer. In an embodiment, the coating comprises 10% to 15% by weight of thermoplastic polymer. In an embodiment, the coating comprises 5% to 10% by weight of thermoplastic polymer. In an embodiment, the coating comprises 8% to 10% by weight of thermoplastic polymer. In an embodiment, the coating comprises 5% to 8% by weight of thermoplastic polymer.

In an embodiment, the coating comprises a filler. In an embodiment, the filler comprises at least one of an organic filler, an inorganic mineral filler, and combinations thereof. In an embodiment, the filler includes one or more of calcium carbonate, barium sulfate, calcium sulfate, talc, limestone, perlite, silica, fumed silica, precipitated silica, quartz, aluminum trihydrate, magnesium hydroxide, colemanite (e.g., hydrated calcium borate), titanium dioxide, snow white (i.e., calcium sulfate), fly ash, graphene nanoparticles, carbon black, recycled rubber tires, recycled shingles, recycled thermoplastic resins, basalt, roofing granules, clay, and combinations thereof. In an embodiment, the filler includes a high aspect ratio filler such as, e.g., graphene nanoparticles or carbon black. In an embodiment, the filler is a recycled material, such as post-consumer recycled asphalt shingles (PCRAS), ground tire rubber (GTR), acrylonitrile rubber (NBR), acrylonitrile butadiene styrene rubber (ABS), or other recycled thermoplastic(s). A non-limiting example of GTR includes GTR, which is available from Lehigh Technologies, Tucker, GA.

In an embodiment, the coating comprises 10% to 70% by weight of filler. In an embodiment, the coating comprises 15% to 70% by weight of filler. In an embodiment, the coating comprises 20% to 70% by weight of filler. In an embodiment, the coating comprises 25% to 70% by weight of filler. In an embodiment, the coating comprises 30% to 70% by weight of filler. In an embodiment, the coating comprises 40% to 70% by weight of filler. In an embodiment, the coating comprises 50% to 70% by weight of filler. In an embodiment, the coating comprises 60% to 70% by weight of filler. In an embodiment, the coating comprises 10% to 60% by weight of filler. In an embodiment, the coating comprises 15% to 60% by weight of filler. In an embodiment, the coating comprises 20% to 60% by weight of filler. In an embodiment, the coating comprises 25% to 60% by weight of filler. In an embodiment, the coating comprises 30% to 60% by weight of filler. In an embodiment, the coating comprises 40% to 60% by weight of filler. In an embodiment, the coating comprises 50% to 60% by weight of filler. In an embodiment, the coating comprises 10% to 50% by weight of filler. In an embodiment, the coating comprises 15% to 50% by weight of filler. In an embodiment, the coating comprises 20% to 50% by weight of filler. In an embodiment, the coating comprises 25% to 50% by weight of filler. In an embodiment, the coating comprises 30% to 50% by weight of filler. In an embodiment, the coating comprises 40% to 50% by weight of filler. In an embodiment, the coating comprises 10% to 40% by weight of filler. In an embodiment, the coating comprises 15% to 40% by weight of filler. In an embodiment, the coating comprises 20% to 40% by weight of filler. In an embodiment, the coating comprises 25% to 40% by weight of filler. In an embodiment, the coating comprises 30% to 40% by weight of filler. In an embodiment, the coating comprises 10% to 30% by weight of filler. In an embodiment, the coating comprises 15% to 30% by weight of filler. In an embodiment, the coating comprises 20% to 30% by weight of filler. In an embodiment, the coating comprises 25% to 30% by weight of filler. In an embodiment, the coating comprises 10% to 25% by weight of filler. In an embodiment, the coating comprises 15% to 25% by weight of filler. In an embodiment, the coating comprises 20% to 25% by weight of filler. In an embodiment, the coating comprises 10% to 20% by weight of filler. In an embodiment, the coating comprises 15% to 20% by weight of filler. In an embodiment, the coating comprises 10% to 15% by weight of filler.

In an embodiment, the coating does not comprise asphalt (i.e., is "free of asphalt"). In other words, the coating includes 0% by weight of asphalt.

In another embodiment, the coating comprises asphalt. In an embodiment, the asphalt added to the coating is in the form of a liquid. In an embodiment, the amount of thermoplastic polymer in the coating is greater than the amount of asphalt in the coating. In an embodiment, the coating comprises 0.1% to 49% by weight of asphalt. In an embodiment, the coating comprises 0.5% to 49% by weight of asphalt. In an embodiment, the coating comprises 1% to 49% by weight of asphalt. In an embodiment, the coating comprises 2% to 49% by weight of asphalt. In an embodiment, the coating comprises 3% to 49% by weight of asphalt. In an embodiment, the coating comprises 4% to 49% by weight of asphalt. In an embodiment, the coating comprises 5% to 49% by weight of asphalt. In an embodiment, the coating comprises 10% to 49% by weight of asphalt. In an embodiment, the coating comprises 15% to 49% by weight of asphalt. In an embodiment, the coating comprises 20% to 49% by weight of asphalt. In an embodiment, the coating comprises 25% to 49% by weight of asphalt. In an embodiment, the coating comprises 30% to 49% by weight of asphalt. In an embodiment, the coating comprises 40% to 49% by weight of asphalt. In an embodiment, the coating comprises 0.1% to 40% by weight of asphalt. In an embodiment, the coating comprises 0.5% to 40% by weight of asphalt. In an embodiment, the coating comprises 1% to 40% by weight of asphalt. In an embodiment, the coating comprises 2% to 40% by weight of asphalt. In an embodiment, the coating comprises 3% to 40% by weight of asphalt. In an embodiment, the coating comprises 4% to 40% by weight of asphalt. In an embodiment, the coating comprises 5% to 40% by weight of asphalt. In an embodiment, the coating comprises 10% to 40% by weight of asphalt. In an embodiment, the coating comprises 15% to 40% by weight of asphalt. In an embodiment, the coating comprises 20% to 40% by weight of asphalt. In an embodiment, the coating comprises 25% to 40% by weight of asphalt. In an embodiment, the coating comprises 30% to 40% by weight of asphalt. In an embodiment, the coating comprises 0.1% to 30% by weight of asphalt. In an embodiment, the coating comprises 0.5% to 30% by weight of asphalt. In an embodiment, the coating comprises 1% to 30% by weight of asphalt. In an embodiment, the coating comprises 2% to 30% by weight of asphalt. In an embodiment, the coating comprises 3% to 30% by weight of asphalt. In an embodiment, the coating comprises 4% to 30% by weight of asphalt. In an embodiment, the coating comprises 5% to 30% by weight of asphalt. In an embodiment, the coating comprises 10% to 30% by weight of asphalt. In an embodiment, the coating comprises 15% to 30% by weight of asphalt. In an embodiment, the coating comprises 20% to 30% by weight of asphalt. In an embodiment, the coating comprises 25% to 30% by weight of asphalt. In an embodiment, the coating comprises 0.1% to 25% by weight of asphalt. In an embodiment, the coating comprises 0.5% to 25% by weight of asphalt. In an embodiment, the coating comprises 1% to 25% by weight of asphalt. In an embodiment, the coating comprises 2% to 25% by weight of asphalt. In an embodiment, the coating comprises 3% to 25% by weight of asphalt. In an embodiment, the coating comprises 4% to 25% by weight of asphalt. In an embodiment, the coating comprises 5% to 25% by weight of asphalt. In an embodiment, the coating comprises 10% to 25% by weight of asphalt. In an embodiment, the coating comprises 15% to 25% by weight of asphalt. In an embodiment, the coating comprises 20% to 25% by weight of asphalt. In an embodiment, the coating comprises 0.1% to 20% by weight of asphalt. In an embodiment, the coating comprises 0.5% to 20% by weight of asphalt. In an embodiment, the coating comprises 1% to 20% by weight of asphalt. In an embodiment, the coating comprises 2% to 20% by weight of asphalt. In an embodiment, the coating comprises 3% to 20% by weight of asphalt. In an embodiment, the coating comprises 4% to 20% by weight of asphalt. In an embodiment, the coating comprises 5% to 20% by weight of asphalt. In an embodiment, the coating comprises 10% to 20% by weight of asphalt. In an embodiment, the coating comprises 15% to 20% by weight of asphalt. In an embodiment, the coating comprises 0.1% to 15% by weight of asphalt. In an embodiment, the coating comprises 0.5% to 15% by weight of asphalt. In an embodiment, the coating comprises 1% to 15% by weight of asphalt. In an embodiment, the coating comprises 2% to 15% by weight of asphalt. In an embodiment, the coating comprises 3% to 15% by weight of asphalt. In an embodiment, the coating comprises 4% to 15% by weight of asphalt. In an embodiment, the coating comprises 5% to 15% by weight of asphalt. In an embodiment, the coating comprises 10% to 15% by weight of asphalt. In an embodiment, the coating comprises 0.1% to 10% by weight of asphalt. In an embodiment, the coating comprises 0.5% to 10% by weight of asphalt. In an embodiment, the coating comprises 1% to 10% by weight of asphalt. In an embodiment, the coating comprises 2% to 10% by weight of asphalt. In an embodiment, the coating comprises 3% to 10% by weight of asphalt. In an embodiment, the coating comprises 4% to 10% by weight of asphalt. In an embodiment, the coating comprises 5% to 10% by weight of asphalt. In an embodiment, the coating comprises 0.1% to 5% by weight of asphalt. In an embodiment, the coating comprises 0.5% to 5% by weight of asphalt. In an embodiment, the coating comprises 1% to 5% by weight of asphalt. In an embodiment, the coating comprises 2% to 5% by weight of asphalt. In an embodiment, the coating comprises 3% to 5% by weight of asphalt. In an embodiment, the coating comprises 4% to 5% by weight of asphalt. In an embodiment, the coating comprises 0.1% to 4% by weight of asphalt. In an embodiment, the coating comprises 0.5% to 4% by weight of asphalt. In an embodiment, the coating comprises 1% to 4% by weight of asphalt. In an embodiment, the coating comprises 2% to 4% by weight of asphalt. In an embodiment, the coating comprises 3% to 4% by weight of asphalt. In an embodiment, the coating comprises 0.1% to 3% by weight of asphalt. In an embodiment, the coating comprises 0.5% to 3% by weight of asphalt. In an embodiment, the coating comprises 1% to 3% by weight of asphalt. In an embodiment, the coating comprises 2% to 3% by weight of asphalt. In an embodiment, the coating comprises 0.1% to 2% by weight of asphalt. In an embodiment, the coating comprises 0.5% to 2% by weight of asphalt. In an embodiment, the coating comprises 1% to 2% by weight of asphalt. In an embodiment, the coating comprises 0.1% to 1% by weight of asphalt. In an embodiment, the coating comprises 0.5% to 1% by weight of asphalt. In an embodiment, the coating comprises 0.1% to 0.5% by weight of asphalt.

In an embodiment, the coating has a viscosity of 500 to 30,000 centipoise at 375° F. to 400° F. In an embodiment, the coating has a viscosity of 500 to 20,000 centipoise at 375° F. to 400° F. In an embodiment, the coating has a viscosity of 500 to 15,000 centipoise at 375° F. to 400° F. In an embodiment, the coating has a viscosity of 500 to 10,000 centipoise at 375° F. to 400° F. In an embodiment, the coating has a viscosity of 500 to 5,000 centipoise at 375° F. to 400° F. In an embodiment, the coating has a viscosity of 500 to 4,000 centipoise at 375° F. to 400° F. In an embodiment, the coating has a viscosity of 500 to 3,000 centipoise at 375° F. to 400° F. In an embodiment, the coating has a viscosity of 500 to 2,000 centipoise at 375° F. to 400° F. In an embodiment, the coating has a viscosity of 500 to 1,000 centipoise at 375° F. to 400° F. In an embodiment, the coating has a viscosity of 1,000 to 30,000 centipoise at 375° F. to 400° F. In an embodiment, the coating has a viscosity of 1,000 to 20,000 centipoise at 375° F. to 400° F. In an embodiment, the coating has a viscosity of 1,000 to 15,000 centipoise at 375° F. to 400° F. In an embodiment, the coating has a viscosity of 1,000 to 10,000 centipoise at 375° F. to 400° F. In an embodiment, the coating has a viscosity of 1,000 to 5,000 centipoise at 375° F. to 400° F. In an embodiment, the coating has a viscosity of 2,000 to 30,000 centipoise at 375° F. to 400° F. In an embodiment, the coating has a viscosity of 2,000 to 20,000 centipoise at 375° F. to 400° F. In an embodiment, the coating has a viscosity of 2,000 to 15,000 centipoise at 375° F. to 400° F. In an embodiment, the coating has a viscosity of 2,000 to 10,000 centipoise at 375° F. to 400° F. In an embodiment, the coating has a viscosity of 2,000 to 5,000 centipoise at 375° F. to 400° F. In an embodiment, the coating has a viscosity of 3,000 to 30,000 centipoise at 375° F. to 400° F. In an embodiment, the coating has a viscosity of 3,000 to 20,000 centipoise at 375° F. to 400° F. In an embodiment, the coating has a viscosity of 3,000 to 15,000 centipoise at 375° F. to 400° F. In an embodiment, the coating has a viscosity of 3,000 to 10,000 centipoise at 375° F. to 400° F. In an embodiment, the coating has a viscosity of 3,000 to 5,000 centipoise at 375° F. to 400° F. In an embodiment, the coating has a viscosity of 5,000 to 30,000 centipoise at 375° F. to 400° F. In an embodiment, the coating has a viscosity of 5,000 to 20,000 centipoise at 375° F. to 400° F. In an embodiment, the coating has a viscosity of 5,000 to 15,000 centipoise at 375° F. to 400° F. In an embodiment, the coating has a viscosity of 5,000 to 10,000 centipoise at 375° F. to 400° F. In an embodiment, the coating has a viscosity of 10,000 to 30,000 centipoise at 375° F. to 400° F. In an embodiment, the coating has a viscosity of 10,000 to 20,000 centipoise at 375° F. to 400° F. In an embodiment, the coating has a viscosity of 10,000 to 15,000 centipoise at 375° F. to 400° F. In an embodiment, the coating has a viscosity of 15,000 to 30,000 centipoise at 375° F. to 400° F. In an embodiment, the coating has a viscosity of 15,000 to 20,000 centipoise at 375° F. to 400° F. In an embodiment, the coating has a viscosity of 20,000 to 30,000 centipoise at 375° F. to 400° F.

In an embodiment, the coating comprises one or more recycled materials. In an embodiment, the recycled material is one or more of polyvinyl butyral (rPVB), post-consumer asphalt shingles (PCRAS), post-manufacture shingle waste, recycled asphaltic membranes, polytransoctenamer rubber (TOR), ground tire rubber (GTR), acrylonitrile rubber (NBR), acrylonitrile butadiene styrene rubber (ABS), wood plastic, polypropylene (PP), and/or atactic polypropylene (APP). A non-limiting example of GTR includes GTR, which is available from Lehigh Technologies, Tucker, GA Other wastes and/or recycled materials that can be incorporated into the coating include, e.g., petroleum coke, high temperature tolerant reinforced resins, poly(methyl methacrylate) (PMMA), polyvinyl chloride (PVC), fly ash, carbon black, titanium dioxide ($TiO_2$), low density polyethylene (LDPE), linear low density polyethylene (LLDPE), high density polyethylene (HDPE), polyethylene terephthalate (PET), recycled styrene butadiene styrene copolymers, recycled engine or processed oils, and/or fatty acids.

In an embodiment, the coating comprises 5% to 80% by weight of a recycled material. In an embodiment, the coating comprises 5% to 70% by weight of a recycled material. In an embodiment, the coating comprises 5% to 60% by weight of a recycled material. In an embodiment, the coating comprises 5% to 50% by weight of a recycled material. In an embodiment, the coating comprises 5% to 40% by weight of a recycled material. In an embodiment, the coating comprises 5% to 30% by weight of a recycled material. In an embodiment, the coating comprises 5% to 20% by weight of a recycled material. In an embodiment, the coating comprises 5% to 10% by weight of a recycled material. In an embodiment, the coating comprises 10% to 80% by weight of a recycled material. In an embodiment, the coating comprises 10% to 70% by weight of a recycled material. In an embodiment, the coating comprises 10% to 60% by weight of a recycled material. In an embodiment, the coating comprises 10% to 50% by weight of a recycled material. In an embodiment, the coating comprises 10% to 40% by weight of a recycled material. In an embodiment, the coating comprises 10% to 30% by weight of a recycled material. In an embodiment, the coating comprises 10% to 20% by weight of a recycled material. In an embodiment, the coating comprises 20% to 80% by weight of a recycled material. In an embodiment, the coating comprises 20% to 70% by weight of a recycled material. In an embodiment, the coating comprises 20% to 60% by weight of a recycled material. In an embodiment, the coating comprises 20% to 50% by weight of a recycled material. In an embodiment, the coating comprises 20% to 40% by weight of a recycled material. In an embodiment, the coating comprises 20% to 30% by weight of a recycled material. In an embodiment, the coating comprises 30% to 80% by weight of a recycled material. In an embodiment, the coating comprises 30% to 70% by weight of a recycled material. In an embodiment, the coating comprises 30% to 60% by weight of a recycled material. In an embodiment, the coating comprises 30% to 50% by weight of a recycled material. In an embodiment, the coating comprises 30% to 40% by weight of a recycled material. In an embodiment, the coating comprises 40% to 80% by weight of a recycled material. In an embodiment, the coating comprises 40% to 70% by weight of a recycled material. In an embodiment, the coating comprises 40% to 60% by weight of a recycled material. In an embodiment, the coating comprises 40% to 50% by weight of a recycled material. In an embodiment, the coating comprises 50% to 80% by weight of a recycled material. In an embodiment, the coating comprises 50% to 70% by weight of a recycled material. In an embodiment, the coating comprises 50% to 60% by weight of a recycled material. In an embodiment, the coating comprises 60% to 80% by weight of a recycled material. In an embodiment, the coating comprises 60% to 70% by weight of a recycled material. In an embodiment, the coating comprises 70% to 80% by weight of a recycled material.

In an embodiment, the coating comprises polytransoctenamer rubber (TOR). A non-limiting example of TOR is TOR 8012 (or Vestenamer 8012) that is available from Evonik, Essen, Germany. TOR can improve the stiffness, viscosity, flexibility and/or compatibility properties of the coating. In an embodiment, the coating comprises 1% to 10% by weight of TOR. In an embodiment, the coating comprises 2% to 10% by weight of TOR. In an embodiment, the coating comprises 3% to 10% by weight of TOR. In an embodiment, the coating comprises 4% to 10% by weight of TOR. In an embodiment, the coating comprises 5% to 10% by weight of TOR. In an embodiment, the coating comprises 8% to 10% by weight of TOR. In an embodiment, the coating comprises 1% to 8% by weight of TOR. In an embodiment, the coating comprises 2% to 8% by weight of TOR. In an embodiment, the coating comprises 3% to 8% by weight of TOR. In an embodiment, the coating comprises 4% to 8% by weight of TOR. In an embodiment, the coating comprises 5% to 8% by weight of TOR. In an embodiment, the coating comprises 1% to 5% by weight of TOR. In an embodiment, the coating comprises 2% to 5% by weight of TOR. In an embodiment, the coating comprises 3% to 5% by weight of TOR. In an embodiment, the coating comprises 4% to 5% by weight of TOR. In an embodiment, the coating comprises 1% to 4% by weight of TOR. In an embodiment, the coating comprises 2% to 4% by weight of TOR. In an embodiment, the coating comprises 3% to 4% by weight of TOR. In an embodiment, the coating comprises 1% to 3% by weight of TOR. In an embodiment, the coating comprises 2% to 3% by weight of TOR. In an embodiment, the coating comprises 1% to 2% by weight of TOR.

In an embodiment, the coating comprises an oil, a resin, a wax, or a combination thereof. In an embodiment, the oil is a hydrocarbon oil. In an embodiment, the oil is a recycled engine and/or process oil and/or a heavy oil from crude oil refining, such as refinery residual oil. Non-limiting examples of oils and/or resins include, but are not limited to, Kendex 0897 and/or Kendex 0967 that are available from American Refining Group, Inc., Bradford, PA; Nynas Oil (Nyflex-223) that is available from Nynas AB, Stockholm, Sweden; Hyprene Process Oils, which are available from Ergon, Inc., Jackson, MS; Hydrolene H600T (i.e., a hydrocarbon oil) that is available from Holly Frontier, Plymouth Meeting, PA; Exxon Evlast C 30, Exxon Evlast D 50, and Exxon UmPAO 65, each of which is available from ExxonMobil, Irving, TX; and/or Ethylene bis-stearamide (CAS #110-30-5), which is available from several suppliers, including, e.g., Acme-Hardesty, Blue Bell, PA Non-limiting examples of waxes include, but are not limited to, amide wax, Fischer Tropsch wax, oxidized polyolefin, and/or BituTech polyaminoamide (PAA) wax that is available from Engineered Additives LLC, Parkesburg, PA Suitable oils, resins and/or waxes have sufficiently high boiling points and flashpoints as to be usable in the mixing process, to generate viscoelastic properties that enable the coating to be poured when hot, without compromising the physical properties of the roofing material (e.g., shingle) when cool.

In an embodiment, the coating comprises 30% to 80% by weight of an oil, a resin, a wax, or a combination thereof. In an embodiment, the coating comprises 40% to 80% by weight of an oil, a resin, a wax, or a combination thereof. In an embodiment, the coating comprises 50% to 80% by weight of an oil, a resin, a wax, or a combination thereof. In an embodiment, the coating comprises 60% to 80% by weight of an oil, a resin, a wax, or a combination thereof. In an embodiment, the coating comprises 70% to 80% by weight of an oil, a resin, a wax, or a combination thereof. In an embodiment, the coating comprises 30% to 70% by weight of an oil, a resin, a wax, or a combination thereof. In an embodiment, the coating comprises 40% to 70% by weight of an oil, a resin, a wax, or a combination thereof. In an embodiment, the coating comprises 50% to 70% by weight of an oil, a resin, a wax, or a combination thereof. In an embodiment, the coating comprises 60% to 70% by weight of an oil, a resin, a wax, or a combination thereof. In an embodiment, the coating comprises 30% to 60% by weight of an oil, a resin, a wax, or a combination thereof. In an embodiment, the coating comprises 40% to 60% by weight of an oil, a resin, a wax, or a combination thereof. In an embodiment, the coating comprises 50% to 60% by weight of an oil, a resin, a wax, or a combination thereof. In an embodiment, the coating comprises 30% to 50% by weight of an oil, a resin, a wax, or a combination thereof. In an embodiment, the coating comprises 40% to 50% by weight of an oil, a resin, a wax, or a combination thereof. In an embodiment, the coating comprises 30% to 40% by weight of an oil, a resin, a wax, or a combination thereof.

Other ingredients may also be added to the coating to further modify their properties. In an embodiment, the coating further comprises a dye, a pigment, a fire retardant, a stabilizer, such as, e.g., a UV stabilizer, or a combination thereof. Non-limiting examples of pigments and/or dyes include colorants, IR reflective pigments and/or dyes, and phosphorescence and/or fluorescence pigments and/or dyes. Non-limiting examples of pigments include, but are not limited to, color pigments and/or reflective pigments, such as Colonial Red, which is a reflective pigment that is available from Americhem Inc., Cuyahoga Falls, OH Non-limiting examples of UV stabilizers include, but are not limited to, UV absorbers, hinder amine light stabilizers, anti-oxidant pigments and/or carriers, such as PP, PE, or IPP. In an embodiment, the coating further includes a tackifier.

In an embodiment, the coating can further include titanium dioxide, such as Ti Pure™ Titanium Dioxide from Chemours, Wilmington, DE Adding titanium dioxide to the coating can, for example, improve and/or increase the reflectivity of a roofing material prepared using the coating.

In an embodiment, the coating comprises a modified asphalt, including, for example, polymer modified asphalt (PMA).

In an embodiment, the coating is in the form of a pourable coating, such as, e.g., a coating that is configured to be a coating for a roofing material, including, e.g., a shingle.

One embodiment of this invention pertains to a coating for a roofing material, in which the coating comprises an oxidized hydrocarbon oil (e.g., H600T). In an embodiment, a majority of the coating (by weight) comprises an oxidized hydrocarbon oil. In an embodiment, the coating comprises 30% to 99% by weight of oxidized hydrocarbon oil. In an embodiment, the coating comprises 30% to 98.5% by weight of oxidized hydrocarbon oil. In an embodiment, the coating comprises 30% to 98% by weight of oxidized hydrocarbon oil. In an embodiment, the coating comprises 30% to 96.5% by weight of oxidized hydrocarbon oil. In an embodiment, the coating comprises 30% to 96% by weight of oxidized hydrocarbon oil. In an embodiment, the coating comprises 30% to 95% by weight of oxidized hydrocarbon oil. In an embodiment, the coating comprises 30% to 94.5% by weight of oxidized hydrocarbon oil. In an embodiment, the coating comprises 30% to 94% by weight of oxidized hydrocarbon oil. In an embodiment, the coating comprises 30% to 90% by weight of oxidized hydrocarbon oil. In an embodiment, the coating comprises 30% to 85% by weight of oxidized hydrocarbon oil. In an embodiment, the coating comprises 30% to 80% by weight of oxidized hydrocarbon oil. In an embodiment, the coating comprises 30% to 75% by weight of oxidized hydrocarbon oil. In an embodiment, the coating comprises 30% to 70% by weight of oxidized hydrocarbon oil. In an embodiment, the coating comprises 30% to 65% by weight of oxidized hydrocarbon oil. In an embodiment, the coating comprises 30% to 60% by weight of oxidized hydrocarbon oil. In an embodiment, the coating comprises 30% to 55% by weight of oxidized hydrocarbon oil. In an embodiment, the coating comprises 30% to 50% by weight of oxidized hydrocarbon oil. In an embodiment, the coating comprises 30% to 45% by weight of oxidized hydrocarbon oil. In an embodiment, the coating comprises 30% to 40% by weight of oxidized hydrocarbon oil.

As discussed above, one embodiment of this invention pertains to a roofing material that comprises a substrate and a coating applied onto the substrate, with the coating comprising (a) 5% to 70% by weight of a thermoplastic polymer and (b) 10% to 70% by weight of a filler, wherein the filler comprises at least one of an organic filler, an inorganic filler, and combinations thereof. According to this embodiment, the coating is free of asphalt. The coating has a viscosity of 500 to 30,000 centipoise at 375° F. to 400° F.

As also discussed above, another embodiment of this invention pertains to a roofing material that comprises a substrate and a coating applied onto the substrate, with the coating comprises (a) 5% to 70% by weight of a thermoplastic polymer, (b) 10% to 70% by weight of a filler, wherein the filler comprises at least one of an organic filler, an inorganic filler, and combinations thereof, and (c) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F.

In an embodiment, the roofing material is configured to be prepared on a substantially standard manufacturing line for asphaltic shingles at a standard speed, ranging from 110 FPM to 1000 FPM. In an embodiment, the roofing material is configured to be prepared on a substantially standard manufacturing line for asphaltic shingles at a standard speed, ranging from 200 FPM to 1000 FPM. In an embodiment, the roofing material is configured to be prepared on a substantially standard manufacturing line for asphaltic shingles at a standard speed, ranging from 350 FPM to 1000 FPM. In an embodiment, the roofing material is configured to be prepared on a substantially standard manufacturing line for asphaltic shingles at a standard speed, ranging from 500 FPM to 1000 FPM. In an embodiment, the roofing material is configured to be prepared on a substantially standard manufacturing line for asphaltic shingles at a standard speed, ranging from 600 FPM to 1000 FPM. In an embodiment, the roofing material is configured to be prepared on a substantially standard manufacturing line for asphaltic shingles at a standard speed, ranging from 750

FPM to 1000 FPM. In an embodiment, the roofing material is configured to be prepared on a substantially standard manufacturing line for asphaltic shingles at a standard speed, ranging from 900 FPM to 1000 FPM. A non-limiting example of a substantially standard manufacturing line for asphaltic shingles is detailed in U.S. Pat. No. 10,195,640, the contents of which are hereby incorporated reference.

In an embodiment, the substrate comprises one of a fiberglass mat or a polyester mat. In an embodiment, the substrate comprises one of a fiberglass mat, a polyester mat, a scrim, a coated scrim, or a combination thereof. In an embodiment, the substrate comprises a fiberglass mat, a polyester mat, a scrim, a coated scrim, and/or other synthetic or natural scrims. In some embodiments, the substrate or mat includes nano-fibrillated cellulose fibers. In another embodiment, the roofing material does not comprise a substrate.

In an embodiment, the roofing material is a roofing shingle. In an embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

In an embodiment, the roofing material further comprises granules. In an embodiment, granules are applied to a surface of the roofing material (e.g., shingle). In an embodiment, the roofing material includes mineral surfacing, such as, e.g., fines, granules, sand, metal flakes and/or reflective granules. In an embodiment, the method includes applying polymer films and/or synthetic and/or natural non-woven and/or woven fabrics, with or without decorative elements, including, for example, printing, embossing and/or protective coatings, to the coating. In an embodiment, photo (e.g., UV) and/or thermal stabilizers are added to a surface of the coating and/or roofing material.

In an embodiment, the thickness of the coating on the substrate is 20 mils to 200 mils. In an embodiment, the thickness of the coating on the substrate is 20 mils to 150 mils. In an embodiment, the thickness of the coating on the substrate is 20 mils to 100 mils. In an embodiment, the thickness of the coating on the substrate is 20 mils to 75 mils. In an embodiment, the thickness of the coating on the substrate is 20 mils to 60 mils. In an embodiment, the thickness of the coating on the substrate is 20 mils to 50 mils. In an embodiment, the thickness of the coating on the substrate is 20 mils to 40 mils. In an embodiment, the thickness of the coating on the substrate is 20 mils to 30 mils. In an embodiment, the thickness of the coating on the substrate is 30 mils to 200 mils. In an embodiment, the thickness of the coating on the substrate is 30 mils to 150 mils. In an embodiment, the thickness of the coating on the substrate is 30 mils to 100 mils. In an embodiment, the thickness of the coating on the substrate is 30 mils to 75 mils. In an embodiment, the thickness of the coating on the substrate is 30 mils to 60 mils. In an embodiment, the thickness of the coating on the substrate is 30 mils to 50 mils. In an embodiment, the thickness of the coating on the substrate is 30 mils to 40 mils. In an embodiment, the thickness of the coating on the substrate is 40 mils to 200 mils. In an embodiment, the thickness of the coating on the substrate is 40 mils to 150 mils. In an embodiment, the thickness of the coating on the substrate is 40 mils to 100 mils. In an embodiment, the thickness of the coating on the substrate is 40 mils to 75 mils. In an embodiment, the thickness of the coating on the substrate is 40 mils to 60 mils. In an embodiment, the thickness of the coating on the substrate is 40 mils to 50 mils. In an embodiment, the thickness of the coating on the substrate is 50 mils to 200 mils. In an embodiment, the thickness of the coating on the substrate is 50 mils to 150 mils. In an embodiment, the thickness of the coating on the substrate is 50 mils to 100 mils. In an embodiment, the thickness of the coating on the substrate is 50 mils to 75 mils. In an embodiment, the thickness of the coating on the substrate is 50 mils to 60 mils. In an embodiment, the thickness of the coating on the substrate is 60 mils to 200 mils. In an embodiment, the thickness of the coating on the substrate is 60 mils to 150 mils. In an embodiment, the thickness of the coating on the substrate is 60 mils to 100 mils. In an embodiment, the thickness of the coating on the substrate is 60 mils to 75 mils. In an embodiment, the thickness of the coating on the substrate is 75 mils to 200 mils. In an embodiment, the thickness of the coating on the substrate is 75 mils to 150 mils. In an embodiment, the thickness of the coating on the substrate is 75 mils to 100 mils. In an embodiment, the thickness of the coating on the substrate is 100 mils to 200 mils. In an embodiment, the thickness of the coating on the substrate is 100 mils to 150 mils. In an embodiment, the thickness of the coating on the substrate is 150 mils to 200 mils. In an embodiment, the thickness of the coating on the substrate is 60 mils.

In an embodiment, the roofing material exhibits an increased (or improved) solar reflectance as compared to an asphaltic roofing material.

In an embodiment, the roofing material comprises one or more layers of the coating, discussed above. In an embodiment, the roofing material comprises one (1) to two (2) layers of the coating. In an embodiment, the roofing material comprises one (1) to three (3) layers of the coating. In an embodiment, the roofing material comprises one (1) to four (4) layers of the coating. In an embodiment, the roofing material comprises one (1) to five (5) layers of the coating. In an embodiment, the roofing material comprises one (1) to six (6) layers of the coating. In an embodiment, the roofing material comprises one (1) to seven (7) layers of the coating. In an embodiment, the roofing material comprises one (1) to eight (8) layers of the coating. In an embodiment, the roofing material comprises one (1) to nine (9) layers of the coating. In an embodiment, the roofing material comprises one (1) to ten (10) layers of the coating. In an embodiment, the roofing material comprises two (2) to ten (10) layers of the coating. In an embodiment, the roofing material comprises three (3) to ten (10) layers of the coating. In an embodiment, the roofing material comprises five (5) to ten (10) layers of the coating. In an embodiment, the roofing material comprises seven (7) to ten (10) layers of the coating.

In an embodiment, the coating comprises at least one layer that is applied to both a top surface and a bottom surface of the substrate. In an embodiment, the coating comprises at least one layer that is applied to both a top surface and a bottom surface of the substrate, and another coating that comprises an asphalt-based coating is applied as at least one layer to both a top surface and a bottom surface of the substrate. In an embodiment, the coating comprises at least one layer that is applied to a top surface of the substrate and another coating that comprises an asphalt-based coating is applied as at least one layer to a bottom surface of the substrate. In another embodiment, the coating comprises at least one layer that is applied to a bottom surface of the substrate and another coating that comprises an asphalt-based coating is applied as at least one layer to a top surface of the substrate.

In some embodiments, the coating is embedded in the substrate to form a coated substrate.

As discussed above, one embodiment of this invention pertains to a method of preparing a roofing material that comprises (a) obtaining a substrate, (b) obtaining a coating comprising (i) 5% to 70% by weight of a thermoplastic polymer, and (ii) 10% to 70% by weight of a filler, wherein the filler comprises at least one of an organic filler, an inorganic mineral filler, and combinations thereof, and (c) applying the coating to a surface of the substrate to form the roofing material. According to this embodiment, the coating is free of asphalt. The coating has a viscosity of 500 to 30,000 centipoise at 375° F. to 400° F.

As also discussed above, another embodiment of this invention pertains to a method of preparing a roofing material that comprises (a) obtaining a substrate, (b) obtaining a coating comprising (i) 5% to 70% by weight of a thermoplastic polymer, (ii) 10% to 70% by weight of a filler, wherein the filler comprises at least one of an organic filler, an inorganic filler, and combinations thereof, and (iii) 0.1% to 49% by weight of asphalt, wherein the amount of the thermoplastic polymer in the coating is greater than the amount of asphalt in the coating. The coating has a viscosity of 500 to 30,000 centipoise at 375° F. to 400° F.

In an embodiment, the method further comprises preparing the coating. In an embodiment, the step of preparing the coating is conducted by mixing the thermoplastic polymer with the filler at 300° F. to 425° F. in one of (i) a low shear mixer or (ii) a high shear mixer. In an embodiment, the step of preparing the coating is conducted by mixing the thermoplastic polymer with the filler at 300° F. to 415° F. In an embodiment, the step of preparing the coating is conducted by mixing the thermoplastic polymer with the filler at 300° F. to 410° F. In an embodiment, the step of preparing the coating is conducted by mixing the thermoplastic polymer with the filler at 300° F. to 400° F. In an embodiment, the step of preparing the coating is conducted by mixing the thermoplastic polymer with the filler at 300° F. to 390° F. In an embodiment, the step of preparing the coating is conducted by mixing the thermoplastic polymer with the filler at 300° F. to 380° F. In an embodiment, the step of preparing the coating is conducted by mixing the thermoplastic polymer with the filler at 300° F. to 375° F. In an embodiment, the step of preparing the coating is conducted by mixing the thermoplastic polymer with the filler at 300° F. to 360° F. In an embodiment, the step of preparing the coating is conducted by mixing the thermoplastic polymer with the filler at 300° F. to 350° F. In an embodiment, the step of preparing the coating is conducted by mixing the thermoplastic polymer with the filler at 300° F. to 340° F. In an embodiment, the step of preparing the coating is conducted by mixing the thermoplastic polymer with the filler at 300° F. to 330° F. In an embodiment, the step of preparing the coating is conducted by mixing the thermoplastic polymer with the filler at 300° F. to 325° F. In an embodiment, the step of preparing the coating is conducted by mixing the thermoplastic polymer with the filler at 300° F. to 315° F. In one embodiment, the mixing of the thermoplastic polymer with the filler is conducted without an extruder. In one embodiment, prior to the mixing of the thermoplastic polymer with the filler, the preparation of the coating is further conducted by (i) modifying a base oil of the coating and (ii) adding the thermoplastic polymer and the filler to the modified base oil of the coating. Such modification methods include, but are not limited to, e.g., air blowing, oxidation reaction(s), and/or addition of thermal, light, and/or oxidation stabilizers. In an embodiment, the step of preparing the coating is conducted under a blanket of an inert gas. In an embodiment, the inert gas is nitrogen.

In an embodiment, the coating is prepared by mixing the various components using static mixing, a low shear mixer, and/or a high shear mixer. A non-limiting example of a low shear mixer is EUROSTAR® 60 Digital, IKA Works, Inc., Wilmington, NC, which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, MA, which mixes batches at or above 3200 RPM, with a blade and a head that are configured to generate high shear, as well as heat mixing. In an embodiment, the mixing of the coating is conducted at an ambient temperature (e.g., about 70° Fahrenheit). In an embodiment, after mixing, the coating is allowed to dry at an ambient temperature (e.g., about 70° Fahrenheit). In another embodiment, after mixing, the coating is dried in an oven at about 90° F. to 140° F.

In an embodiment, the coating is mixed in an extruder and/or high shear mixer at 330° F. to 425° F., and then the coating is discharged from the high shear mixer at 330° F. to 410° F. and roll pressed into sheets. In an embodiment, the coating is discharged from the mixer at 330° F. to 400° F. In an embodiment, the coating is discharged from the mixer at 330° F. to 390° F. In an embodiment, the coating is discharged from the mixer at 330° F. to 380° F. In an embodiment, the coating is discharged from the mixer at 330° F. to 375° F. In an embodiment, the coating is discharged from the mixer at 330° F. to 360° F. In an embodiment, the coating is discharged from the mixer at 330° F. to 350° F. In an embodiment, the coating is discharged from the mixer at 330° F. to 340° F. In an embodiment, the coating is pressed into a glass mat. According to one embodiment, once the coating is roll pressed, it is capped with granules and cut to the desired shape.

In an embodiment, the coating is in the form of a pourable coating formulation that is mixed at 300° F. to 425° F. or 330° F. to 410° F. in an extruder and/or low shear mixer. In an embodiment, the pourable coating formulation, which is generally at 380° F. to 420° F. after mixing, is then poured onto a glass mat on one or both sides and roll pressed to impregnate and saturate the mat. In an embodiment, granules are then applied and the roofing material (e.g., shingle(s)) is cut to the desired shape.

In one embodiment, the step of applying the coating to the surface of the substrate to form the roofing material is conducted on a substantially standard manufacturing line for asphaltic shingles at a standard speed, ranging from 110 FPM to 1000 FPM. As discussed above, a non-limiting example of a substantially standard manufacturing line for asphaltic shingles is detailed in U.S. Pat. No. 10,195,640, the contents of which are hereby incorporated reference.

In an embodiment, the method further comprises applying granules to the coating. In an embodiment, granules are applied to a surface of the roofing material (e.g., shingle). In an embodiment, the method includes applying mineral surfacing to the coating, such as, e.g., fines, granules, sand, metal flakes and/or reflective granules. In an embodiment, the method includes applying polymer films and/or synthetic and/or natural non-woven and/or woven fabrics, with or without decorative elements, including, for example, printing, embossing and/or protective coatings, to the coating. In an embodiment, photo (e.g., UV) and/or thermal stabilizers are added to a surface of the coating and/or roofing material.

In one embodiment, the substrate comprises one of a fiberglass mat or a polyester mat. In an embodiment, the substrate comprises one of a fiberglass mat, a polyester mat, a scrim, a coated scrim, or a combination thereof. In an embodiment, the substrate comprises a fiberglass mat, a polyester mat, a scrim, a coated scrim, and/or other synthetic or natural scrims. In some embodiments, the substrate or mat includes nano-fibrillated cellulose fibers. In another embodiment, the roofing material does not comprise a substrate.

In one embodiment, the roofing material is a roofing shingle. In one embodiment, the roofing shingle satisfies ICC acceptance criteria for an alternative non-asphaltic shingle. According to one embodiment, the roofing shingle is one of (i) a single layer shingle or (ii) a laminated shingle having two or more layers.

According to one embodiment, the above-described coatings can also be used to make commercial roofing membranes (e.g., low slope roofing membranes), with and without granules, with a glass mat, a polyester mat, and/or hybrid mats.

be understood that these examples are disclosed by way of illustrating the invention and should not be taken in any way to limit the scope of the present invention.

Coatings Comprising PVB

Example 1

Compositions as per Table 1 below were prepared using a continuous high shear mixer with the exiting high viscosity compound flowing out of the mixer discharge at 330° F. to 410° F. These compositions were then roll pressed (with or without a mat substrate) into sheets. The resulting sheets were then capped with granules and cut into the desired pattern. The sheets can be used to produce various shingle designs, including, e.g., laminates.

TABLE 1

| | | 60 mils thick ungranulated lab sample | | |
|---|---|---|---|---|
| Formulations | Asphalt (Control) | 27% Vistamaxx 6102/20% rPVB/ 3% TOR/50% CaCO$_3$ Filler | 42% Vistamaxx 6102/25% rPVB/ 3% TOR/30% Perlite Filler | 27% Vistamaxx 6102/20% rPVB/3% TOR/50% PCRAS |
| CD Tear without Glass Mat (gf) | Not Tested | 3600 | 3900 | 1528 |
| CD Tear with Glass Mat (gf) | 1176 | 3000 | 2805 | 2428 |
| MD Tensile without Glass Mat(lbf) | Not Tested | 42 | 68 | 30 |
| MD Tensile with Glass Mat(lbf) | 152 | 184 | 118 | 103 |
| MD Elongation without Glass Mat(%) | Not Tested | 382 | 22 | 5.6 |
| MD Elongation with Glass Mat(%) | 4 | 5 | 3.3 | 3.8 |
| Crack Rating over 1" Mandrel at 35° F. without Glass mat | Not Tested | 5 | 5 | 5 |
| Crack Rating over 1" Mandrel at 35° F. with Glass mat | 2 | 5 | 5 | 5 |
| Crack Rating over 1" Mandrel at 0° F. without Glass mat | Not Tested | 3 | 3 | 2 |
| Crack Rating over 1" Mandrel at 0° F. with Glass mat | 0 | 3.5 | 3.5 | 3.5 |
| Water absorption after 14 days soak at 77° F. (%) | 5% | 2% | 2% | 4% |

MD = Machine Direction; CD = Cross Machine Direction; All material quantities are weight percent based on the total weight of the coating.

Embodiments of the invention avoids or minimizes the need to include asphalt in coatings for roofing materials, while being able to utilize a wide range of other materials, including, e.g., thermoplastic polymers, recycled materials, hydrocarbon oil(s), and fillers. When asphalt is used according to embodiments of the invention, it is generally applied as an additive to modify the rheology of the coating at a weight percent of up to 49% (based on the total weight of the coating). The use of recycled materials reduces costs and protects the environment without compromising roofing material and/or shingle properties. The roofing materials (e.g., shingles) according to embodiments of the invention may also provide enhanced low temperature properties and have lighter weight. For example, the roofing materials (e.g., shingles) according to embodiments of the invention may exhibit greater flexibility than traditional shingles (i.e., asphaltic shingles) at low temperature, thus, facilitating installation. In addition, the coating according to embodiments of the invention can be processed on conventional shingle production lines, whilst using mostly solid inputs.

EXAMPLES

Figure 2:
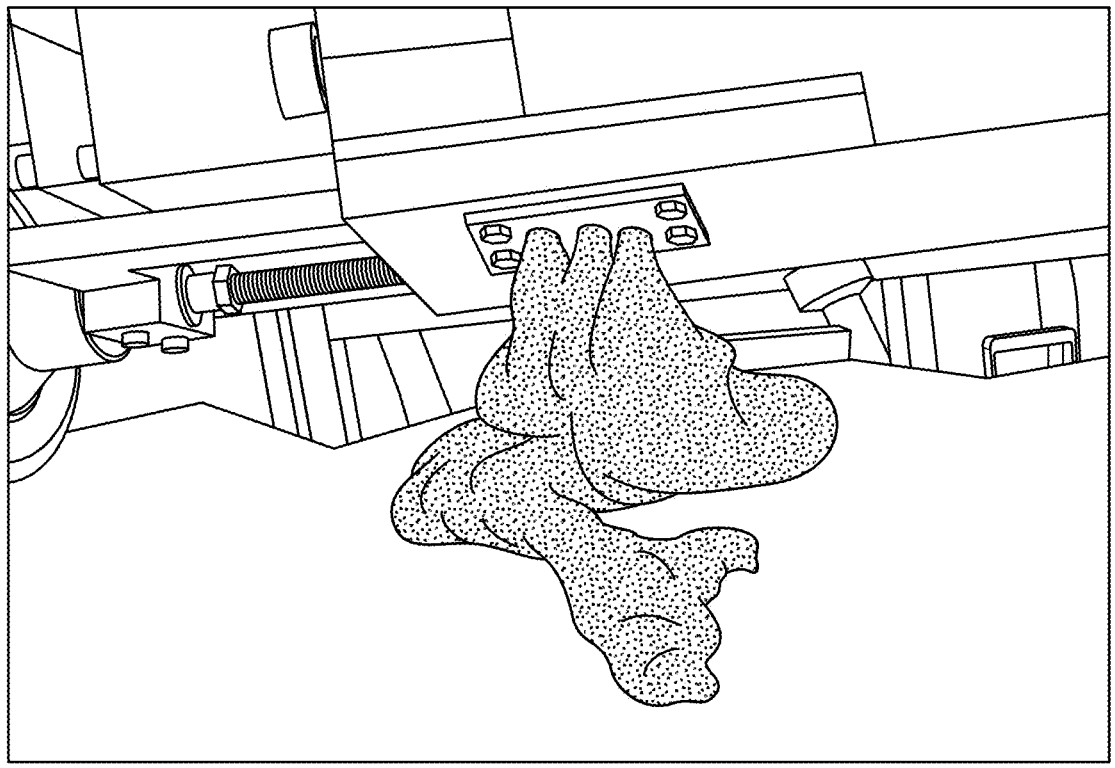
Figure 3:
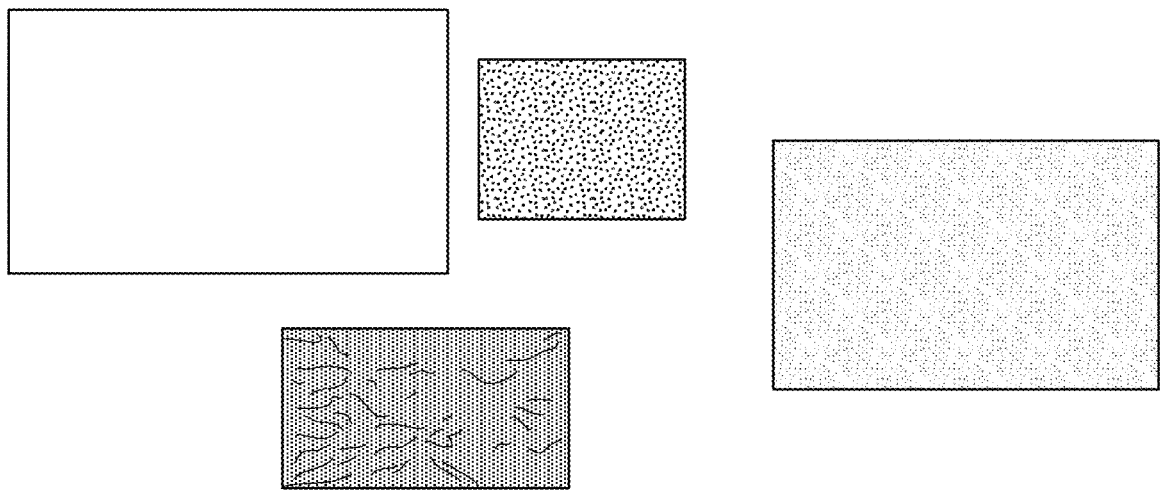
FIGS. 3 & 4 are photographs of shingles produced by roll pressing shingle coating formulations according to embodiments of the invention (both with and without embedded granules).
Figure 4:
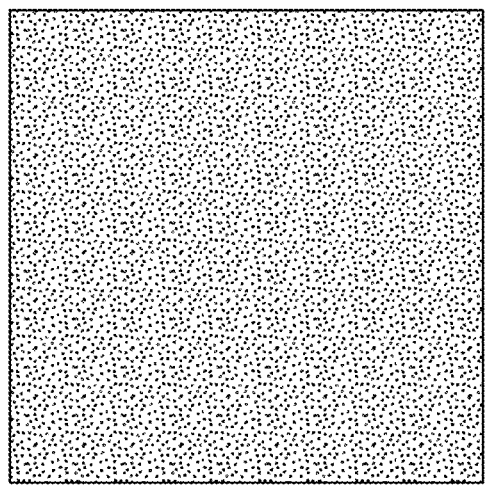

Specific embodiments of the invention will now be demonstrated by reference to the following examples. It should Photographs of the shingle coating formulations before roll pressing are shown in FIGS. 1 & 2. Photographs of shingles produced by roll pressing of these formulations (both with and without granules) are shown in FIGS. 3 & 4.

The test results in Table 1 show that the coated substrates of this invention have equivalent or improved mechanical properties compared to the asphalt-based control.

Example 2

Pourable roofing material (e.g., shingle) coatings were prepared which included polymers, an oil or a resin, and a wax. The coatings were prepared by mixing the polymer and wax components together using a continuous high shear mixer at 300° F. to 375° F., followed by cut back with oil or resin using a low shear mixer at 300° F. to 400° F. The appropriate filler loadings were then added to each formulation and mixed using a low shear mixer at 300° F. to 400° F. These compositions, and their properties, are given in Table 2 below in comparison to a control shingle comprising a traditional asphalt coating.

TABLE 2

| Formulation | Asphalt (Control) | 13% Vistamaxx 6102/12.5% rPVB/3.5% TOR/5.0% PAA/66% ARG 0897 = "853-R" | 13.5% Vistamaxx 6102/13.5% rPVB/3.5% TOR/7.5% PAA/62% H600T = "851-R" | 14% Vistamaxx 6102/14% rPVB/10% PAA/62% H600T = "852-R" |
|---|---|---|---|---|
| Unfilled Coating | | | | |
| Softening Point | 215° F. | 265° F. | 289° F. | 290° F. |
| PEN at 77° F. | 17 dmm | 132 dmm | 79 dmm | 74 dmm |
| Viscosity at 400° F. | 287 cP | 2608 cP | 6913 cP | 9231 cP |
| COC Flashpoint | 610° F. | 570 | 590 | 585 |
| Stain | 9 | 9 | 3 | 3 |
| Top | Not tested | Not tested | 286° F. | 287° F. |
| Bottom | Not tested | Not tested | 295° F. | 290° F. |
| Limestone Filler | 65% | 63% | 52% | 52% |
| Softening Point | 242° F. | 281° F. | 295° F. | 293° F. |
| PEN at 77° F. | 9 dmm | 60 dmm | 29 dmm | 25 dmm |
| Viscosity at 400° F. | 2418 cP | 12450 cP | 28910 cP | 106180 cP |
| DSR Full Durability Number | 186 MPa/s | Not tested | 13 MPa/s | 9 MPa/s |

COC = Cleveland Open-Cup; PEN = Penetration grading; PAA = Polyaminoamide; DSR = Dynamic Shear Rheometer; "Top" and "Bottom" values refer to the separation tendency as measured by softening point when the material is stored without agitation according to ASTM D7173; Viscosity was performed following ASTM D 4402 using size 31 spindle at 1 to 250 rpm; All material quantities are weight percent based on the total weight of the coating.

Figure 5:
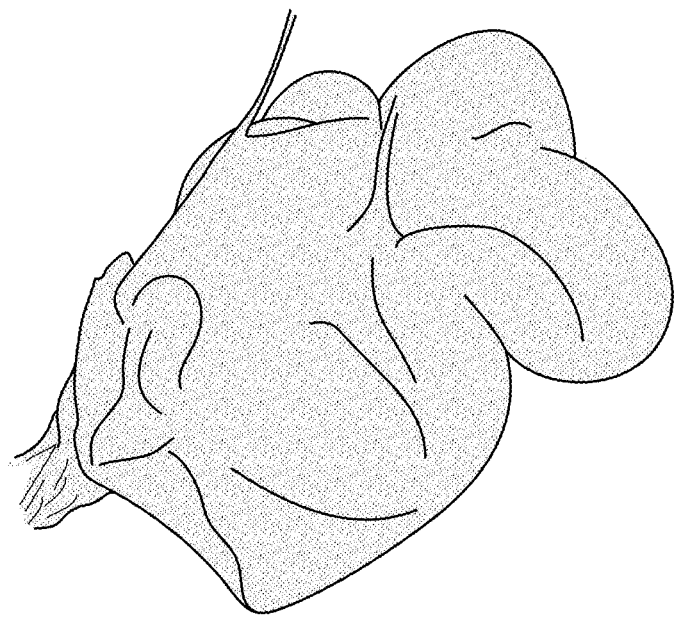
FIG. 5 is a photograph of a shingle coating formulation according to embodiments of the invention.
Figure 6:
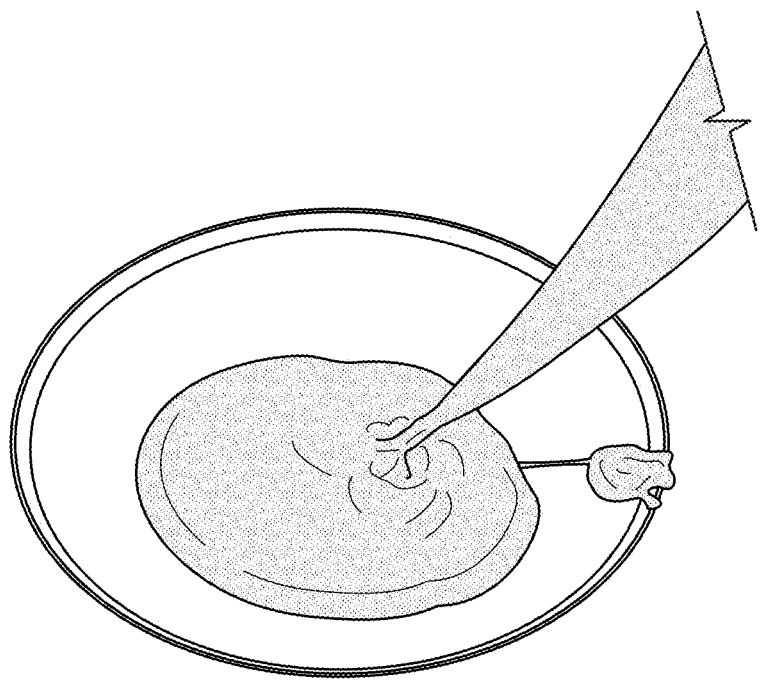
FIG. 6 is a photograph of a pourable shingle coating formulation according to embodiments of the invention.

FIGS. 5 and 6 are photographs of the pourable roofing material (e.g., shingle) coatings as prepared above.

Example 3

Figure 7:
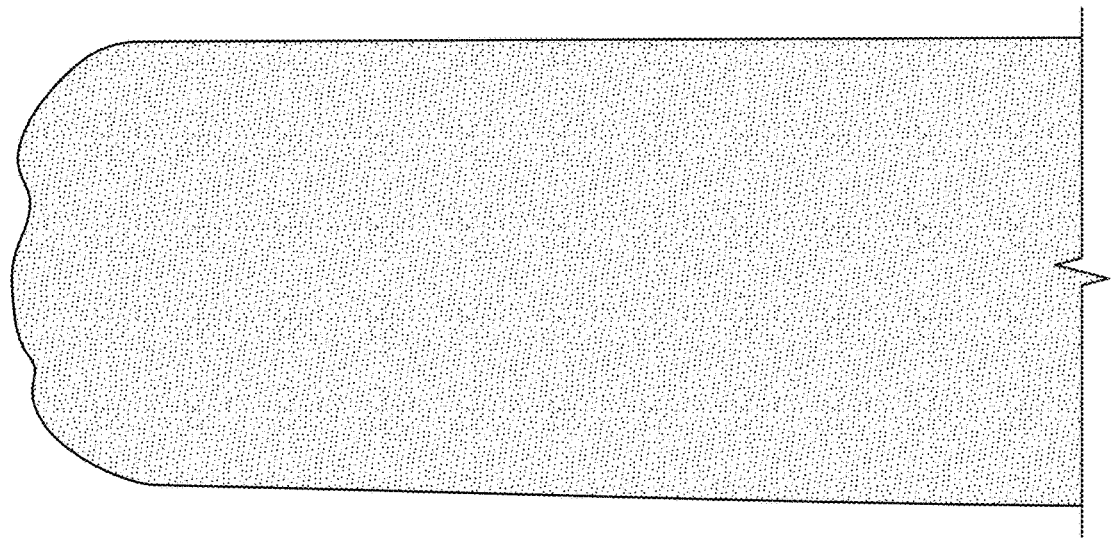
FIG. 7 is a photograph of a pourable shingle coating formulation according to embodiments of the invention roll pressed into a glass mat to a thickness of 60 mils.
Figure 8:
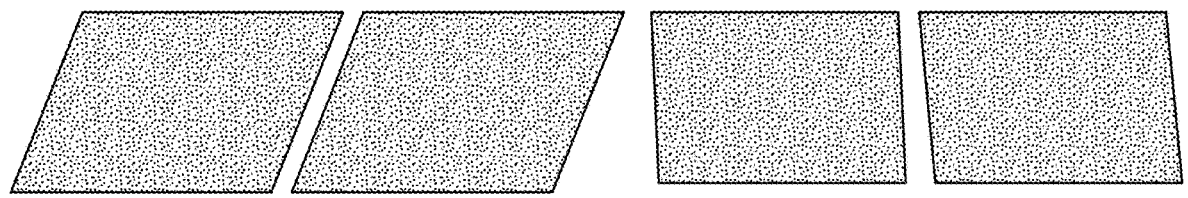
FIG. 8 is a photograph of shingles comprising pourable shingle coating formulations according to embodiments of the invention that have been coated with granules.

The pourable roofing material (e.g., shingle) coating(s) of Example 2 was poured onto both sides of a glass mat at 380° F. to 420° F. and roll pressed to saturate the glass mat, similar to the conventional shingle production plant process. The saturated sheet was roll pressed to 60 mils thickness and tested, by comparing the roll pressed sample to an asphalt-coated mat control. FIG. 7 is a photograph of a pourable shingle coating roll pressed into a glass mat to a thickness of 60 mils. FIG. 8 is a photograph of shingles comprising the pourable roofing material (e.g., shingle) coating that have been coated with granules.

Table 3 gives the physical properties of 60 mils thick ungranulated shingles comprising the pourable roofing material (e.g., shingle) coating compared to the asphalt-coated shingle control.

TABLE 3

| Formulations | Asphalt (Control) | 851-R | 852-R |
|---|---|---|---|
| CD Tear with Glass Mat (gf) | 1176 | 1825 | 1316 |
| MD Tensile with Glass Mat (lbf) | 152 | 99 | 127 |
| MD Elongation with Glass Mat(%) | 4 | 3.4 | 3.5 |
| Crack Rating over 1" Mandrel at 35° F. with Glass mat | 3 | 5 | 5 |
| Crack Rating over 1" Mandrel at 0° F. with Glass mat | 0 | 4 | 4 |
| Water absorption after 14 days soak at 77° F. | 5% | 2% | 5% |

MD = Machine Direction;
CD = Cross Machine Direction

The results shown in Table 3 above illustrate that the non-asphaltic coatings according to embodiments of the invention have equivalent or improved mechanical properties compared to the asphalt-coated shingle control, including improved material flexibility as indicated by bending over a 1 inch diameter mandrel.

Figure 9:
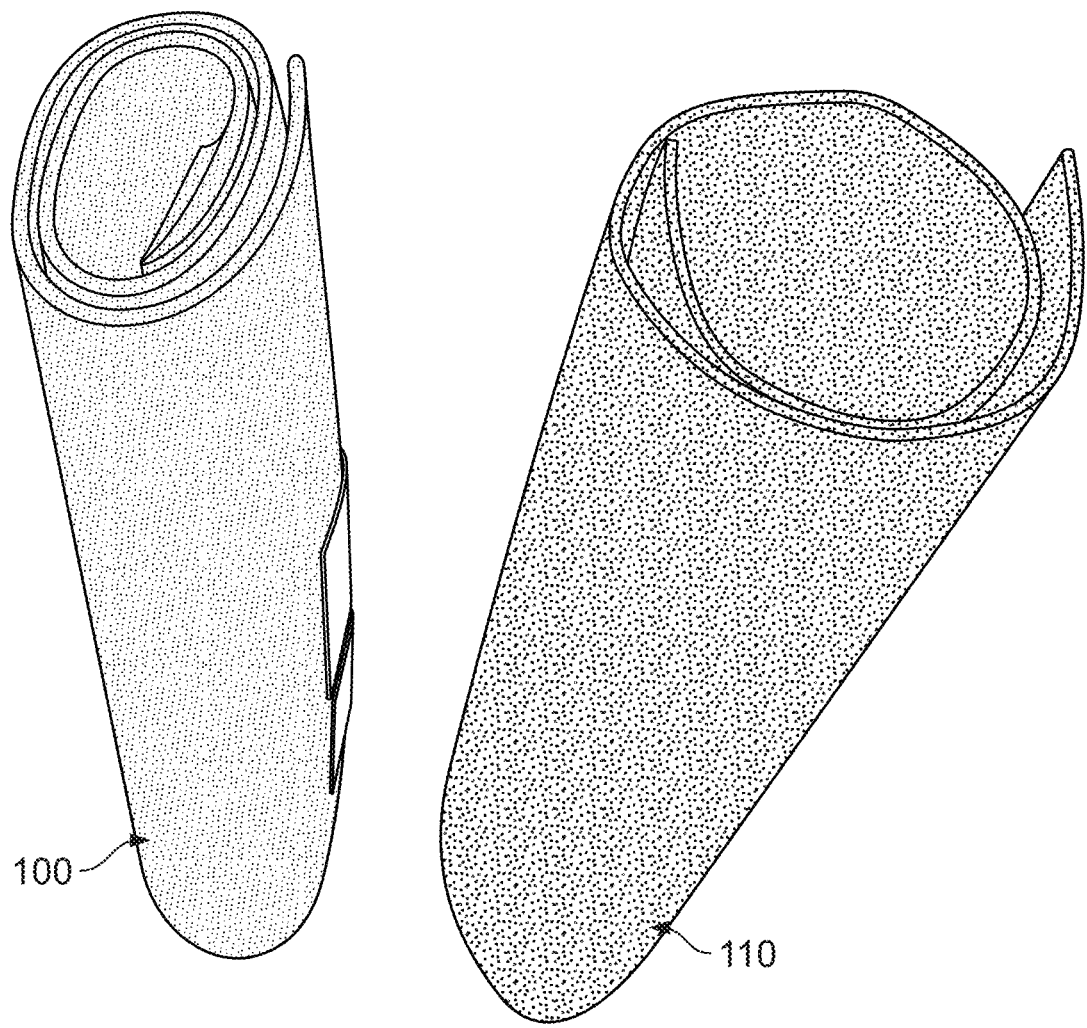
FIG. 9 is a photograph comparing a rolled shingle (100) comprising a pourable shingle coating according to embodiments of the invention (left), with a rolled conventional shingle (110) (right).

For example, FIG. 9 is a photograph comparing a rolled shingle comprising a pourable shingle coating according to embodiments of the invention (100) (left), with a rolled conventional shingle (110) (right) at 77° F. The inventive shingle can be rolled tighter than the control shingle without cracking.

Figure 10:
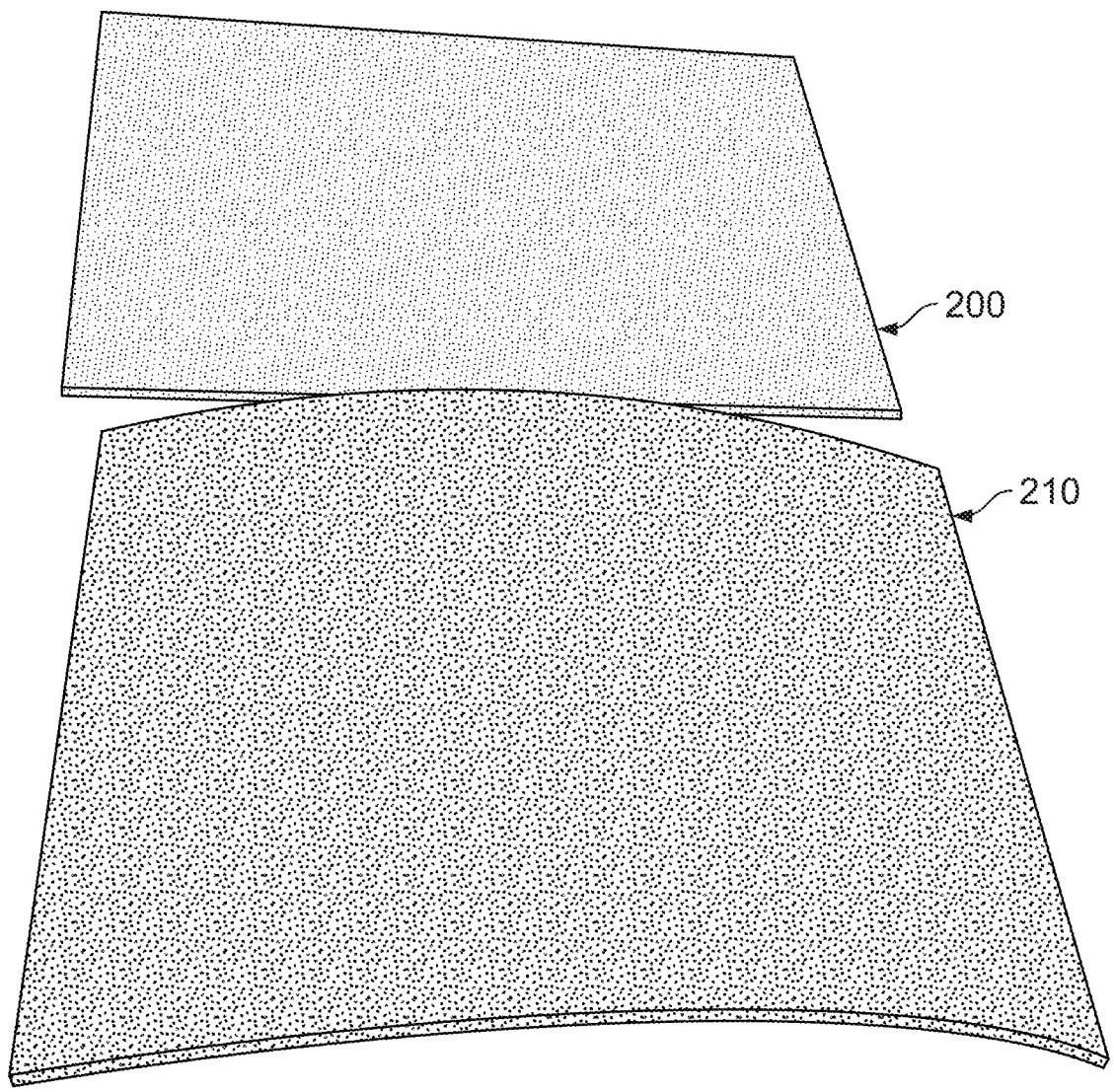
FIG. 10 is a photograph comparing a shingle (200) comprising a pourable shingle coating according to embodiments of the invention (upper), with a conventional shingle (210) (lower) immediately after unrolling.

Also, after the rolled shingle was unwound and placed on the floor, the inventive shingle immediately relaxed to lay flat on the ground. In comparison, the control shingle made with asphalt coating took over 30 minutes to fully relax. This is shown in the photograph of FIG. 10 in which the inventive shingle (200) lays flatter than the asphaltic shingle control (210). These experiments show that the shingles of embodiments of the invention have improved flexibility, and could be more easily installed in cold weather compared with asphalt shingles. The test results shown in Table 3 above also indicate that although some of the physical properties of the non-asphaltic coatings are somewhat different to the control, they can still be processed on conventional shingle production lines with little to no modification to process and/or plant equipment.

Example 4

Shingles were made by initially dipping a glass mat into an emulsion of: (i) recycled PVB (see FIG. 11) and (ii) approximately 50% by weight of water. The mat specimens were submersed in the PVB emulsion 0, 1, 3 or 5 times, and after each dip were hung in an oven to dry at 150° F. Weighing and measuring the samples showed that additional PVB was deposited on the mat with each dip, see Table 4 below.

TABLE 4

| Metric | Control Mat (0 Mat dip) | 1 Time Mat dip | 3 Times Mat dip | 5 Times Mat dip |
|---|---|---|---|---|
| Weight (g) | 4.1 | 18 | 37 | 49 |
| Thickness (mils) | 25 | 34 | 41 | 49 |

Figure 11:
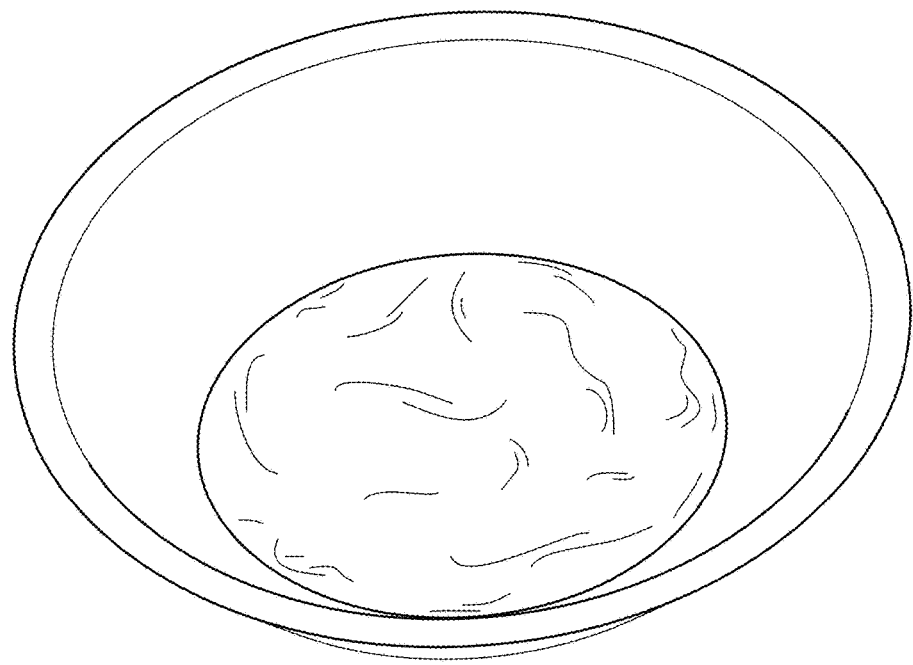
FIG. 11 is a photograph of a pail of PVB emulsion.
Figure 12:
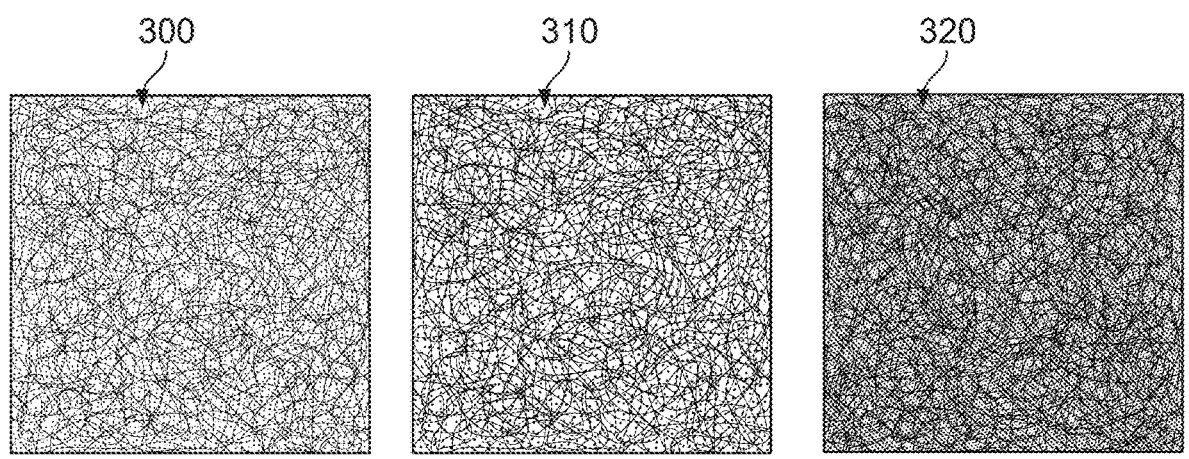
FIG. 12 is a photograph of mat specimens that have been dipped in PVB emulsion.

FIG. 12 is a photograph of three mats that have been dipped in the PVB emulsion (see FIG. 11). The control mat (left) (300) was not dipped, the center mat (310) has been dipped once, and the right mat (320) was dipped three times. The mat that was dipped five times is not shown.

Example 5—Improved Solar Reflectance

In this Example, a non-asphaltic roofing material according to embodiments of the invention ("920R") was prepared and compared to an asphaltic roofing material ("Control") with respect to solar reflectance. According to this example, the non-asphaltic coating according to embodiments of the invention ("920R") comprises 40% by weight of an APAO (RT2304), 6% by weight of a polypropylene (Vistamaxx® 6102), 3% by weight of TOR, 15% by weight of recycled PVB (rPVB), and 36% by weight of a hydrocarbon oil (H600T). As shown in Table 5 below, the solar reflectance of the asphaltic roofing material ("Control") is compared to the non-asphaltic roofing material according to embodiments of the invention ("920R"). The solar reflectance was measured using a Solar Spectrum Reflectometer, which is available from Devices and Services Co., Dallas, TX

TABLE 5

| Material | Solar Reflectance | SR Change over Control |
|---|---|---|
| Coating Samples without Granules | | |
| Asphalt Filled coating (Control) | 0.041 | N/A |
| 920-R Filled coating | 0.173 | 322% |
| Samples covered with Colored Granules | | |
| Asphalt Shingle Dragon Teeth (Control) | 0.098 | N/A |
| 920-R Lab shingle 60 mils Non-Asphaltic Coating | 0.131 | 34% |
| 920-R Lab shingle 50 mils Non-Asphaltic Coating | 0.137 | 40% |
| Pure Colored Granules | 0.114 | 16% |

As shown in Table 5 above, each of the prepared non-asphaltic roofing materials according to embodiments of the invention exhibited an increased (or improved) solar reflectance as compared to the asphaltic roofing materials ("Control").

Example 6—Further Exemplary Shingle Coating Formulations Using PVB

Additional non-limiting examples of shingle coating formulations using PVB are detailed below.
Exemplary Shingle Coating Formulation A
66.6% by weight of Vistamaxx® 6102 PP and 33.3% by weight of recycled PVB were mixed using a low shear mixer for 45-60 minutes at 275-375° F. The resulting material was then pressed into sheets of various thicknesses with or without a mat substrate and hot granules poured onto the sheets. A hand roller was then used to press hot granules into the hot sheets.
Exemplary Shingle Coating Formulation B
50% by weight of Vistamaxx® 6102 PP, 20% by weight of recycled PVB, and 5% by weight of TOR were mixed for 45-60 minutes at 275-400° F. 25% by weight of expanded perlite by weight was then added and mixing continued for 30-40 minutes. The resulting material was then pressed into sheets of various thicknesses with or without a mat substrate and hot granules poured onto the sheets. A hand roller was then used to press hot granules into the hot sheets.

The same process was used to make a shingle coating formulation comprising 63% by weight of Vistamaxx® 6102 PP, 10% by weight of recycled PVB, 5% by weight of TOR, and 22% by weight of expanded perlite.

Following the same process, this formulation was prepared with the addition of 0.2% by weight of graphene nanoparticles. This filler has platelet shaped particles that have a high aspect ratio of up to 10,000. The graphene nanoparticles act as a reinforcing filler and further increase the toughness and tenacity of the shingle coating formulation. Other high aspect ratio fillers, such as carbon black, can also provide such a reinforcing effect.
Exemplary Shingle Coating Formulation C
30% by weight of Vistamaxx® 6102 PP, 17% by weight of recycled PVB, and 3% by weight of TOR were mixed for 45-60 minutes at 275-375° F. 50% by weight of post-consumer recycled asphalt shingle (PCRAS) by weight was added and mixing continued for 30-40 minutes at 350-425° F. The resulting material was then pressed into sheets of various thicknesses with or without a mat substrate and hot granules poured onto the sheets. A hand roller was then used to press hot granules into the hot sheets.

The same process was used to make a shingle coating formulation comprising 37% by weight of Vistamaxx® 6102 PP, 10% by weight of recycled PVB, 3% by weight of TOR, 50% by weight of chopped and ground PCRAS.
Exemplary Shingle Coating Formulation D
50% by weight of PCRAS was added to a PVB aqueous emulsion (50% by weight of water) and mixed for 30 minutes at ambient temperature. The material was then allowed to dry to the touch. The resulting material was then pressed into sheets of various thicknesses with a mat substrate and hot granules poured onto the sheets. A hand roller was then used to press hot granules into the hot sheets. In this example, the shingle is made from 100% recycled materials.
Exemplary Composition E
1%-10% by weight of water-based color pigments or dyes were added to a 50% aqueous PVB emulsion and mixed for up to 30 minutes at ambient temperature of about 70° Fahrenheit. The resulting material was then allowed to dry or used to coat a substrate (mat) or surface of interest before drying. In some cases, reinforcing fillers and stabilizer were added. The material was also allowed to dry to the touch. The colored coating material was then used as paint or coating on concrete, wood and drywall.
Coatings Comprising Polyolefins Example 7

Non-asphaltic coatings and coated substrates were prepared according to the formulations illustrated in Table 6 below. In general, the polymers (e.g., polyolefins) were added to and mixed in a low shear mixer (EUROSTAR® 60 Digital, IKA Works, Inc., Wilmington, NC) at about 390° F. at 500 to 1500 RPM. The polymers (e.g., polyolefins) were added according to the weight percentages shown in Table 6 below. Once the polymers melted, all other solids, except for the fillers, were added (according to the weight percentages shown in Table 6 below) and mixed in the low shear mixer. Next the liquid (i.e., hydrocarbon oil and/or other oils) were added (according to the weight percentages shown in Table 6 below) and mixed in the low shear mixer. Finally, the fillers were added (according to the weight percentages shown in Table 6 below) and mixed in the low shear mixer. Thereafter, the mixed coatings were then applied to a surface of a substrate (i.e., a glass mat) to prepare an exemplary coated substrate.

Various properties for the prepared non-asphaltic coatings and/or coated substrates are also illustrated in Table 6 below. For example, the properties of viscosity (Vis) (centipoise or CP at 400° F.) (as measured according to ASTM D 4402), softening point (SP) (° F.) (as measured according to ASTM D 36), penetration grading or room temperature (PEN) (dmm) (as measured according to ASTM D 5), basis weight (lbs/CSF) for a glass mat used in the coated substrates prepared using the various coatings, machine direction (MD) and cross machine direction (CD) tear (grams, g) (as measured according to ASTM D 1922, as modified by ASTM D 228), nail pull through (lbf) (as measured according to ASTM D 3462), weatherometer (hours) (as measured according to modified ASTM G0155-05A, ASTM D 6878-08, Irradiance level: 0.70 W/m$^2$), tensile strength (lbf/inch) in the MD and CD (as measured according to ASTM 5147), elongation (%) in the MD and CD (as measured according to ASTM 5147), ultimate elongation (%) in the MD and CD (as measured according to ASTM 5147), low temperature flexibility (° C.) in the MD and CD (as measured according to ASTM 5147), BYK-Gardener Impact Test (lbs-inch) (as measured according to ASTM 5420), total thickness (mils) of the coated substrate (as measured according to ASTM D 5147), reflectivity (as measured according to ASTM E 903), and CIELAB color space (or CIE L*a*b*) values for the coated substrates that were prepared with a white reflective pigment ("Snow White" or white calcium sulfate and/or titanium dioxide) and/or a red reflective pigment ("Colonial Red"), in which the "L" value expresses the lightness of the coated substrate, the "a" value expresses the green to red coloring of the coated substrate, and the "b" value expresses the blue to yellow coloring of the coated substrate (as measured according to ASTM E 1347).

TABLE 6

| Formulations/ Properties | Asphalt Shingle (Control) | LV26 | LV29 | LV31 | LV32 | LV33 | LV34 | LV35 |
|---|---|---|---|---|---|---|---|---|
| Surface | | | | No Granules | | | White | White | Red |
| Oxidized Asphalt (18 Pen) | 33 | | | | | | | |
| E1060 (APO) | | 10 | 8 | 8 | 8 | 10 | 10 | 5 |
| P1023 (APO) | | | | 18 | 18 | | 20 | 20 |
| M1025 (APO) | | 20 | 18 | | | 20 | | |
| Vistamaxx 8880 (IPP) | | | | | 3 | 3 | 3 | 3 |
| Engage 7487 (POE) | | 3 | 2.5 | 2.5 | 2.5 | 3 | 3 | 3 |
| SEBS 1657 (SEBS) | | 3 | 2.5 | 2.5 | 2.5 | 3 | 3 | 3 |
| Ethylene bis stearamide (EBS) | | 1 | 1 | 1 | 1 | 1 | 1 | 1 |
| Nyflex 223 (nynas oil) | | 10 | 10 | 10 | 10 | 10 | 10 | 10 |
| Isotactic polypropylene (IPP) | | 3 | 3 | 3 | | | | |
| Limestone | 67 | 50 | 50 | 50 | 50 | | | |
| UV Stabilizer | | | 5 | 5 | 5 | | | 5 |
| White Filler (Snow White) | | | | | | 40 | 40 | 43 |
| Titanium Dioxide | | | | | | 10 | 10 | 2 |
| Reflective Pigment (Colonial Red) | | | | | | | | 5 |
| TOTAL | 100 | 100 | 100 | 100 | 100 | 100 | 100 | 100 |
| Viscosity (CP) (at 400° F.) | 3800 | 3800 | 16000 | 6800 | 15000 | 6500 | 8000 | 17000 |
| Softening Point (SP) (° F.) | 260 | 290 | 311 | 299 | 312 | 293 | 295 | 295 |
| Penetration Grading (PEN) | 10 | 36 | 19 | 29 | 24 | 25 | 23 | 21 |
| Glass Mat Basis Weight (lbs/CSF) | 1.63 | 1.63 | 1.63 | 1.63 | 1.63 | 1.63 | 1.63 | 1.63 |
| Tear MD (g) Specs 1700 | 1350 | 1050 | 1350 | 1000 | 1350 | 1300 | 1150 | 1100 |
| Tear CD (g) Specs 1700 | 1050 | 1750 | 1950 | 1850 | 2000 | 1750 | 1750 | 1750 |
| Nail Pull Through RT (lbf) | 26 | 18 | 18 | 13 | 15 | Not Tested | Not Tested | Not Tested |
| Weatherometer (Pass/Fail) (Hrs) | 950/1100 | 80/150 | 3000/3200 | 3000/3200 | 3000/3200 | 2050/2250 | 2050/2250 | 3200/3500 |
| Tensile MD | 98-124 | 52.3-59.7 | 59-79 | 51-65 | 69-83 | 57-75 | 47-57 | 64.7-67.3 |
| Tensile CD | 32.5-45.5 | 5.5-18.5 | 26.5-27.6 | 23.2-24.8 | 26.2-27.8 | 17-25 | 15-19 | 25.5-26.8 |
| Elongation MD | 2.8-3.2 | 2.7-3.3 | 2.2-3.8 | 1.5-2.5 | 2.5-3.5 | 2.5-3.5 | 2.3-3.7 | 2.7-3.3 |
| Elongation CD | 2.5-3.5 | 4.9-9.1 | 2.6-3.4 | 2.8-3.2 | 2.8-3.22 | 1.8-2.2 | 2.8-3.2 | 1.8-2.2 |
| Ultimate Elongation MD | 3.9-4.1 | 6.8-7.2 | 3.4-4.6 | 4.8-5.3 | 4.8-5.3 | 4.8-5.3 | 6.0-8.1 | 3.4-4.7 |
| Ultimate Elongation CD | 6.4-7.6 | 6.3-11.7 | 83-9.7 | 7-8 | 7-8 | 3.5-4.5 | 7-8 | 5.5-6.5 |

TABLE 6-continued

| Formulations/ Properties | Asphalt Shingle (Control) | LV26 | LV29 | LV31 | LV32 | LV33 | LV34 | LV35 |
|---|---|---|---|---|---|---|---|---|
| Low Temp Flexibility MD (Pass/Fail) (C.) | Fail 4.4 | −30/not tested | −30/−33 | −30/−33 | −30/−33 | −24/not tested | −24/not tested | −24/not tested |
| Low Temp Flexibility CD (Pass/Fail) (C.) | Fail 4.4 | −30/not tested | −30/−33 | −30/−33 | −30/−33 | −24/not tested | −24/not tested | −24/not tested |
| BYK Impact Test (lbs-inch) | Not Tested | 48 | 80 | 96 | 85 | 78 | 86 | 104 |
| Total Thickness (mils) | Not Tested | 52 | 62 | 60 | 58 | 55 | 52 | 58 |
| Reflectivity | Not Tested | Not Tested | Not Tested | Not Tested | Not Tested | 0.8 | 0.8 | 0.3 |
| L | Not Tested | Not Tested | Not Tested | Not Tested | Not Tested | 92.2 | 91.9 | 12.2 |
| a | Not Tested | Not Tested | Not Tested | Not Tested | Not Tested | 0.4 | 0.4 | 28.5 |
| b | Not Tested | Not Tested | Not Tested | Not Tested | Not Tested | 8.2 | 8.7 | 21.1 |

MD = Machine Direction; CD = Cross Machine Direction; All material quantities are weight percent based on the total weight of the coating.

As shown in Table 6 above, each of the prepared non-asphaltic coatings and/or coated substrates exhibited properties that are comparable to and/or superior to those properties of a traditional asphaltic coating and/or coated substrate ("Control").

Example 8

Coatings and coated substrates were prepared according to the formulations illustrated in Table 7 below, in which the amount of asphalt ("Pen Asphalt") added to the coatings was changed, to illustrate the effect of asphalt on the properties of the polymer based coatings. The coatings and/or coated substrates were prepared in the same manner as described above for Example 7, except for the addition of asphalt. For example, as shown in Table 7 below, the amount of asphalt ("Pen Asphalt") was increased from 0% by weight (1-N2 IPP) to 5% by weight (1-N2 IPP MAP1), 20% by weight (2-N2 MAP-3), 30% by weight (2-N2 MAP 4), and 40% by weight (2-N2 MAP 5).

Various properties for the prepared coatings and/or coated substrates are also shown in Table 7 below, to illustrate the effect of asphalt on the properties of the polymer based coatings. For example, the properties of viscosity (centipoise or CP at 375° F.) (as measured according to ASTM D 4402), softening point (SP) (° F.) (as measured according to ASTM D 36), penetration grading or room temperature (PEN) (dmm) (as measured according to ASTM D 5), machine direction (MD) and cross machine direction (CD) tensile strength (lbf/inch) (as measured according to ASTM 5147), elongation (%) in the MD and CD (as measured according to ASTM 5147), and tear (g) in the CD (as measured according to ASTM D 1922, as modified by ASTM D 228).

TABLE 7

| Formulations/Properties | 1-N2 IPP | 1-N2 MAP1 | 2-N2 MAP3 | 2-N2 MAP4 | 2-N2 MAP5 |
|---|---|---|---|---|---|
| E1060 (APO) | 5 | 4 | 2.5 | 1.25 | 0.75 |
| Ethylene bis stearamide (EBS) | 5 | 4 | 2 | 1 | 0.5 |
| UV & Thermal Stabilizers | 4 | 4 | 4 | 4 | 1.5 |
| P1023 (APO) | 9.5 | 9.5 | 5.75 | 3.25 | 0.5 |
| Vistamaxx 8880 (IPP) | 5 | 4 | 3 | 1.5 | 0.5 |
| Engage 7487 (POE) | 2 | 2 | 1 | 0.5 | 0.25 |
| SEBS 1657 (SEBS) | 3 | 2 | 1 | 0.5 | 0.25 |
| Isotactic polypropylene (IPP) | 1.5 | 1 | 0.75 | 0.5 | 0.25 |
| Nyflex 223 (nynas oil) | 10 | 9.5 | 5 | 2.5 | 0.5 |
| 150-200 Pen Asphalt | 0 | 5 | 20 | 30 | 40 |
| Limestone | 50 | 50 | 50 | 50 | 50 |
| Colemanite | 5 | 5 | 5 | 5 | 5 |
| TOTAL | 100 | 100 | 100 | 100 | 100 |
| Glass Mat Basis Weight (lbs/CSF) | 1.62 | 1.62 | 1.62 | 1.62 | 1.62 |
| Viscosity (CP) (at 375° F.) | 9200 | 8200 | 4500 | 1500 | 800 |
| Softening Point (SP) (° F.) | 301 | 297 | 295 | 267 | 168 |
| Penetration Grading (PEN) | 25 | 32 | 33 | 60 | 83 |
| Tensile MD | 44 | 46 | 44 | 54 | 45 |
| Elongation MD | 5 | 2 | 3 | 3 | 4 |

TABLE 7-continued

| Formulations/Properties | 1-N2 IPP | 1-N2 MAP1 | 2-N2 MAP3 | 2-N2 MAP4 | 2-N2 MAP5 |
|---|---|---|---|---|---|
| Tensile CD | 26 | 24 | 20 | 16 | 21 |
| Elongation CD | 9 | 3 | 3 | 3 | 2 |
| Tear CD (g) | 1450 | 1900 | 1650 | 1700 | 1800 |

MD = Machine Direction; CD = Cross Machine Direction; All material quantities are weight percent based on the total weight of the coating.

As shown in Table 7 above, the viscosity, softening point (SP), penetration (PEN), elongation, and CD tear of each of the prepared coatings and/or coated substrates varied as the amount of asphalt added to the coating was increased. The MD and CD tensile strength remained relatively constant as the amount of asphalt added to the coating was increased.

By preparing the coatings and visually inspecting the samples for this example, it was determined that asphalt is miscible with the non-asphaltic coatings.

Example 9

Non-asphaltic coatings and coated substrates were prepared according to the formulations illustrated in Table 8 below, to illustrate the effect of inert gas, e.g., nitrogen, blanketing the head space while making the coatings. The non-asphaltic coatings and/or coated substrates were prepared in the same manner as described above for Example 7. The first coating ("1-Air") was prepared under an air blanket, while the second coating ("1-N2") was prepared under a nitrogen gas blanket.

Various properties for the prepared coatings and/or coated substrates are also shown in Table 8 below, to illustrate the effect of inert gas blanketing the head space while making the coatings. For example, the properties of viscosity (centipoise or CP at 375° F.) (as measured according to ASTM D 4402), softening point (SP) (° F.) (as measured according to ASTM D 36), penetration grading or room temperature (PEN) (dmm) (as measured according to ASTM D 5), CIELAB color space (or CIE L*a*b*) values, in which the "L" value expresses the lightness of the coated substrate, the "a" value expresses the green to red coloring of the coated substrate, and the "b" value expresses the blue to yellow coloring of the coated substrate (as measured according to ASTM E 1347), dE (no units), Y1E313 (or YI—Yellowness Index), weatherometer (hours) (as measured according to modified ASTM G0155-05A, ASTM D 6878-08, Irradiance level: 0.70 W/m²), basis weight (lbs/CSF) for a glass mat used in the coated substrates prepared using the various coatings, machine direction (MD) and cross machine direction (CD) tensile strength (lbf/inch) (as measured according to ASTM 5147), elongation (%) in the MD and CD (as measured according to ASTM 5147), and tear (g) in the CD (as measured according to ASTM D 1922, as modified by ASTM D 228).

TABLE 8

| Formulations/Properties | 1-Air | 1-N2 |
|---|---|---|
| E1060 (APO) | 5.75 | 5.75 |
| Ethylene bis stearamide (EBS) | 5 | 5 |
| UV Stabilizer | 2.25 | 2.25 |
| P1023 (APO) | 11 | 11 |
| Vistamaxx 8880 (IPP) | 6 | 6 |
| Engage 7487 (POE) | 2 | 2 |
| SEBS 1657 (SEBS) | 3 | 3 |
| Nyflex 223 (nynas oil) | 10 | 10 |
| Limestone | 50 | 50 |
| Colemanite | 5 | 5 |
| TOTAL | 100 | 100 |
| Viscosity (CP) (at 375° F.) 5 hrs | 6500 | 8000 |
| Viscosity (CP) (at 375° F.) 9 hrs | 5000 | 8000 |
| Viscosity (CP) (at 375° F.) 12 hrs | 4500 | 7500 |
| Viscosity (CP) (at 375° F.) 18 hrs | 4300 | 7500 |
| Softening Point (SP) (° F.) | 285 | 285 |
| Penetration Grading (PEN) | 27 | 27 |
| L | 48 | 69 |
| a | 8 | 3 |
| b | 23 | 18 |
| dE | 42 | 63 |
| Y1E313 (D65/10) | 72 | 44 |
| Weatherometer | No crazing | No crazing |
| Glass Mat Basis Weight (lbs/CSF) | 1.62 | 1.62 |
| Tensile MD | 68 | 64 |
| Elongation MD | 4 | 3 |
| Tensile CD | 23 | 27 |
| Elongation CD | 4 | 3 |
| Tear CD (g) | 1260 | 1260 |

MD = Machine Direction; CD = Cross Machine Direction; All material quantities are weight percent based on the total weight of the coating.

As shown above through this example, as well as Table 8 above, the coatings formed under an inert gas (nitrogen) resulted in greater stability of the coating viscosity over time compared with the coatings formed under an air blanket. Antioxidants also may be used to minimize the decrease in viscosity or chain sessions of the polyolefin could be used while making the batch coatings.

Example 10

Non-asphaltic coatings were prepared according to the formulations illustrated in Table 9 below, in order to prepare exemplary roofing materials (e.g., shingles and sheets). The non-asphaltic coatings were prepared in the same manner as described above for Example 7.

TABLE 9

| Raw Materials | Standard | White | Red |
|---|---|---|---|
| E1060 (APO) | 8 | 8 | 8 |
| P1023 (APO) | 18 | 18 | 18 |
| Vistamaxx 8880 (IPP) | 6 | 7 | 7 |
| Engage 7487 (POE) | 3 | 3 | 3 |
| SEBS 1657 (SEBS) | 3 | 3 | 3 |
| Ethylene bis stearamide (EBS) | 2 | 2 | 2 |
| Nyflex 223 (nynas oil) | 10 | 10 | 10 |
| Antioxidant (Irganox 1010) | | 1 | 1 |
| UV Stabilizers (in polypropylene carrier) | 5 | 3 | 5 |
| Reflective Pigment (Colonial Red) | | | 5 |
| White Filler (Snow White) | | 30 | |

TABLE 9-continued

| Raw Materials | Standard | White | Red |
|---|---|---|---|
| Titanium Dioxide (Ti Pure) | | 10 | |
| Limestone | 40 | | 33 |
| Colemanite | 5 | 5 | 5 |
| TOTAL | 100 | 100 | 100 |

MD = Machine Direction; CD = Cross Machine Direction; All material quantities are weight percent based on the total weight of the coating.

Figure 13:
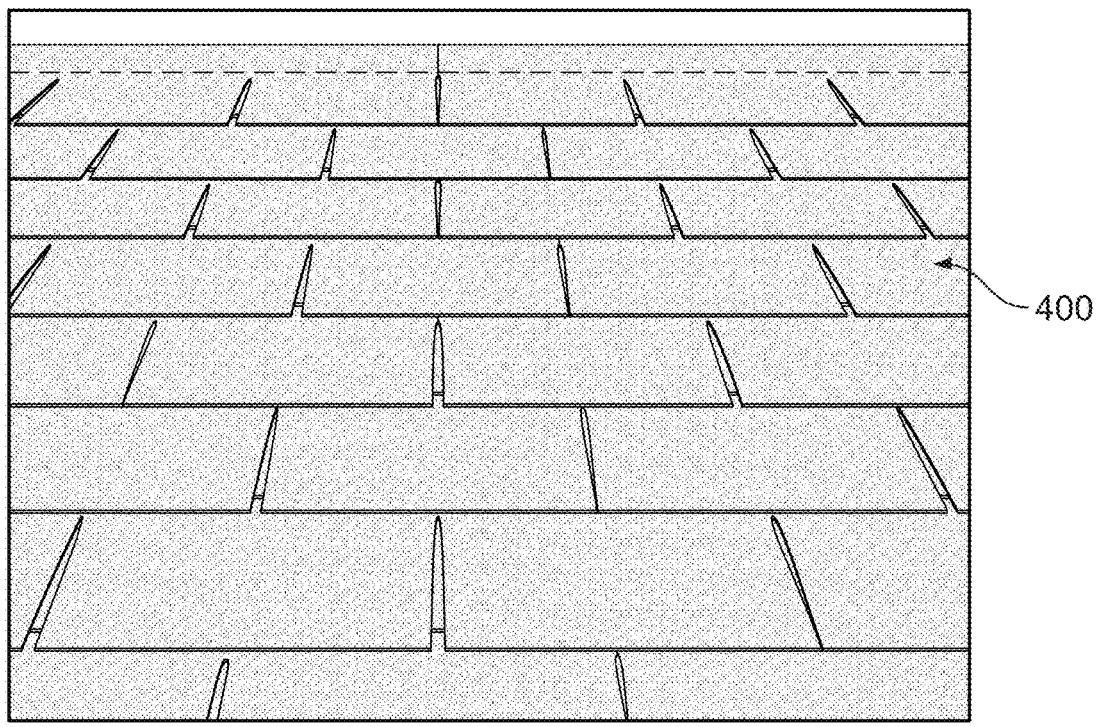
FIG. 13 is a photograph of a non-asphaltic three-tab shingle according to embodiments of the invention with granules applied.
Figure 14:
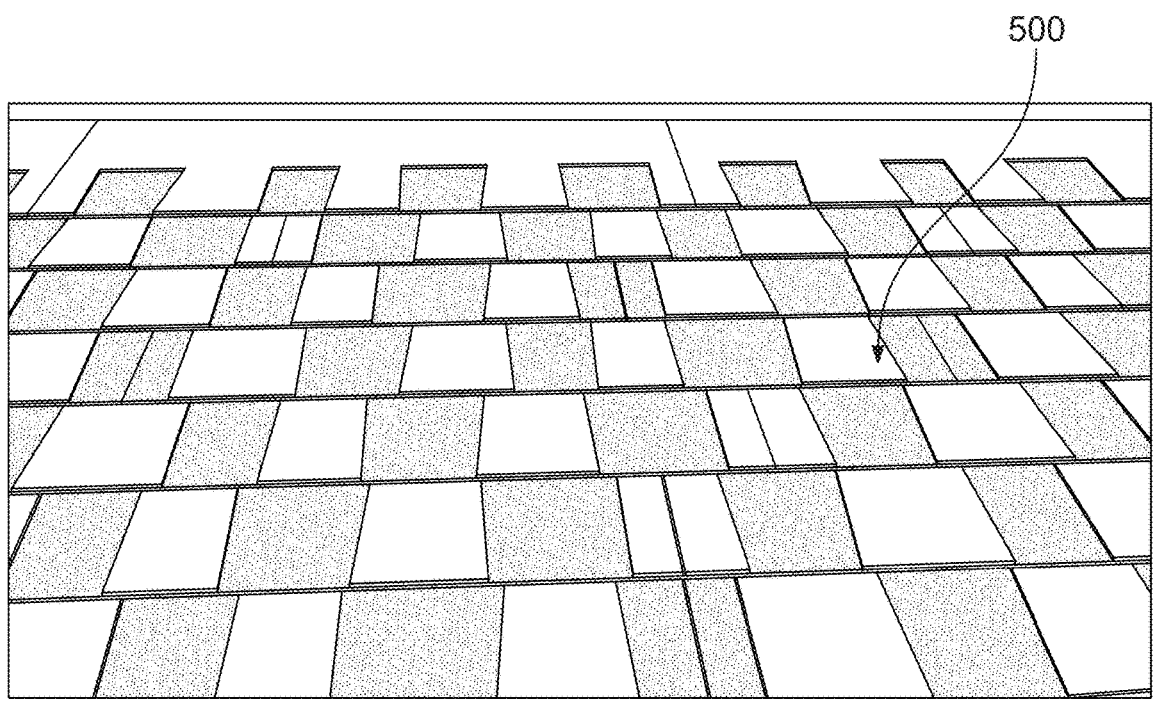
FIG. 14 is a photograph of non-asphaltic reflective laminated shingles according to embodiments of the invention.
Figure 15:
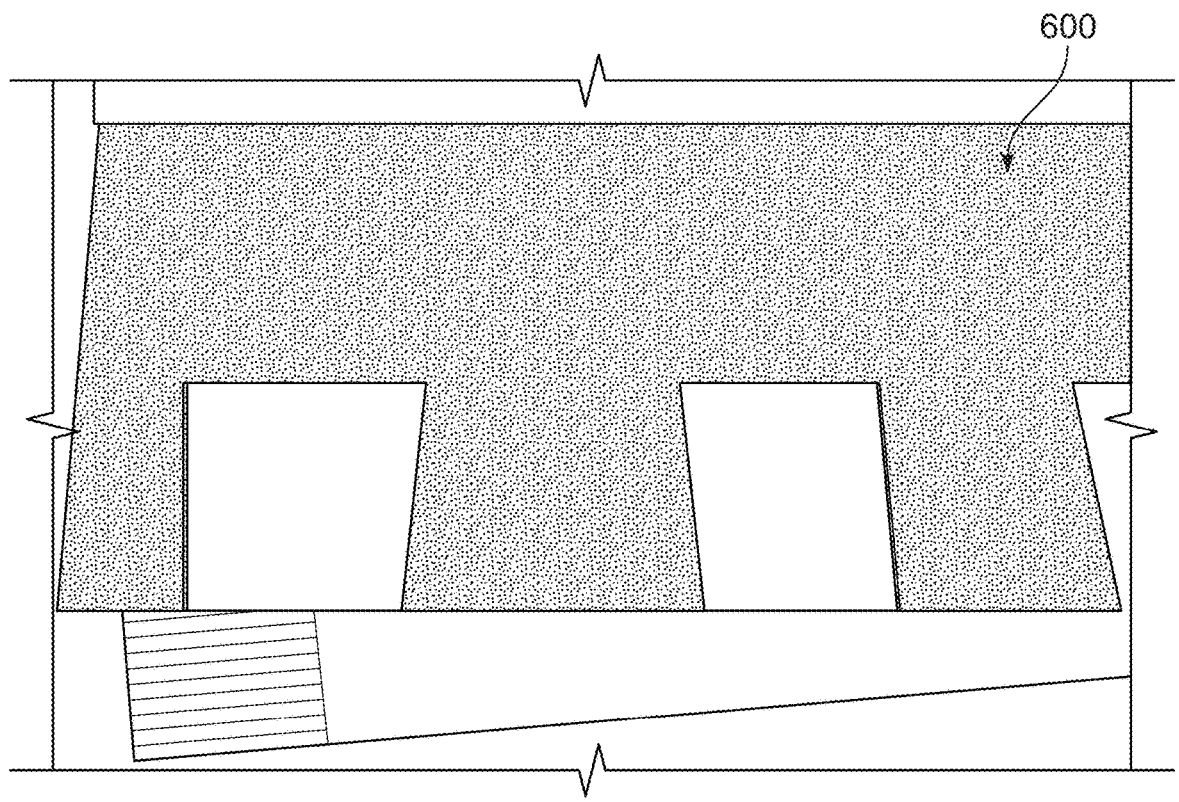
FIG. 15 is a photograph of non-asphaltic laminated shingles according to embodiments of the invention.
Figure 16:
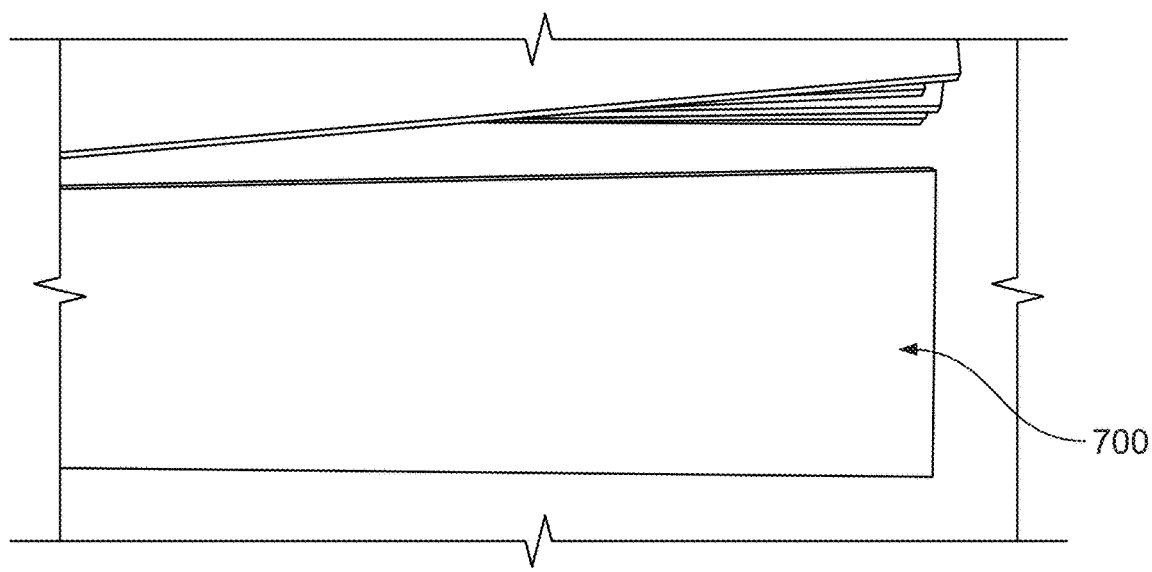
FIG. 16 is a photograph of a white non-asphaltic reflective sheet according to embodiments of the invention.

These coatings were then prepared into exemplary roofing materials. For example, as shown in FIG. 13, non-asphaltic three-tab shingles (400) were prepared using the coatings described above, with granules and a butyl self-seal. Additionally, as shown in FIG. 14, non-asphaltic reflective (30%) laminated shingles (500) were prepared using the coatings described above, with a butyl lamination adhesive and a butyl seal-seal. FIG. 15 illustrates non-asphaltic laminate shingles (600) that were prepared using the coatings described above, while FIG. 16 illustrates a white non-asphaltic reflective sheet (700) that was prepared using the coatings described above.

Various properties of the non-asphaltic coated substrate sheets prepared according to the formulations described in Table 9 above are shown in Table 10 below. These sheets were produced on a substantially standard production line for asphaltic shingles, and then cut and/or laminated into the exemplary roofing materials described above.

TABLE 10

| Properties | Units | Std-1A | Std-1 | Std-2 | Std-3 | WHT-1 | WHT-2 | WHT-3 |
|---|---|---|---|---|---|---|---|---|
| Mat | | Polyester | Glass | Glass | Glass | Glass | Polyester | Polyester |
| GSM | | 140 | | | | | 180 | 140 |
| Lbs/CSF | | | 1.88 | 1.88 | 1.88 | 1.88 | | |
| Top surface | | Granule | Granule | NA Comp. | NA Comp. | NA Comp. | NA Comp. | NA Comp. |
| Thickness | in | 0.098 | 0.085 | 0.061 | 0.057 | 88 | 102 | 93 |
| total weight | lbs/CSF | 49.5 | 53.0 | 33.8 | 29.7 | 59.9 | 59.7 | 61.1 |
| Top coat weight | lbs/CSF | 7.28 | 21.6 | 5.4 | 5.9 | 20.5 | 23.3 | 20.0 |
| back coat weight | lbs/CSF | 1.7 | 9.2 | 9.9 | 7.6 | 17.6 | 18.1 | 18.3 |
| total thickness | mils | 78 | 96 | 54 | 49 | 95 | 89 | 93 |
| Top coat thickness | mils | 38.6 | 48 | 6 | 10 | 29 | 39 | 30 |
| back coat thickness | mils | 11.4 | 13 | 23 | 12 | 25 | 26 | 26 |
| Max Load md | lbf/in | 62 | 93 | 95 | 92 | 94 | 95 | 70 |
| Elongation @ Max md | % | 4 | 3 | 3 | 3 | 3 | 37 | 4 |
| Elongation @ 5% Max md | % | 50 | 3 | 4 | 3 | 9 | 38 | 57 |
| Max Load cd | lbf/in | 35 | 86 | 73 | 70 | 77 | 66 | 40 |
| Elongation @ Max cd | % | 44 | 3 | 3 | 3 | 3 | 44 | 35 |
| Elongation @ 5% Max cd | % | 57 | 4 | 4 | 4 | 3 | 54 | 49 |
| Low Temp Flex @ −30 C. (P/F) (C.) | | p 27// f −30 | p 27// f −30 | p −30 | p −30 | p 27// f −30 | p 27// f −30 | p 27// f −30 |
| Tear md | g | 1070 | 950 | 850 | 850 | 1100 | 2400 | 1650 |
| Tear cd | g | 1600 | 1100 | 1000 | 950 | 1440 | 2650 | 2200 |
| 45 days aged 80 C. | | | | | | | | |
| Max Load md | lbf/in | 62 | 58 | 98 | 93 | 87 | 103 | 62 |
| Elongation @ Max md | % | 3 | 4 | 3 | 3 | 4 | 41 | 4 |
| Elongation @ 5% Max md | % | 4 | 42 | 4 | 4 | 4 | 45 | 57 |
| Max Load cd | lbf/in | 35 | 37 | 81 | 65 | 78 | 67 | 34 |
| Elongation @ Max cd | % | 44 | 43 | 3 | 3 | 3 | 43 | 18 |
| Elongation @ 5% Max cd | % | 57 | 58 | 4 | 4 | 4 | 62 | 54 |
| a | | | | | | 0 | 0.03 | 0.02 |
| b | | | | | | 9.5 | 10.4 | 9.4 |
| dE | | | | | | 9.4 | 10.4 | 9.9 |
| WI E313(65/10) | | | | | | 30 | 25.1 | 27.4 |
| Y brightness | | | | | | 75.4 | 70.6 | 72.8 |
| Y1E313(D65/10) | | | | | | 18.4 | 18.4 | 18.3 |
| Y1D1925(C/2) | | | | | | 17.9 | 17.9 | 17.8 |
| Reflectivity | | | | | | 71 | 71 | 71 |
| 3000 hrs WOM | | | | | | | | |
| a | | | | | | −0.5 | −0.4 | −0.5 |
| b | | | | | | 4.1 | 3.7 | 4.14 |
| dE | | | | | | 87.9 | 87.7 | 88.1 |
| WI E313(65/10) | | | | | | 64.9 | 66.2 | 65.4 |
| Y brightness | | | | | | 84 | 83.3 | 84.4 |
| Y1E313(D65/10) | | | | | | 7.6 | 6.8 | 7.5 |
| Y1D1925(C/2) | | | | | | 7.1 | 6.4 | 7.1 |
| Reflectivity | | | | | | 0.8 | 0.8 | 0.8 |

TABLE 10-continued

| | | | | | | | | |
|---|---|---|---|---|---|---|---|---|
| back coat thickness | mils | 11.4 | 13 | 23 | 12 | 29 | 26 | 26 |
| Nail pull Laminate | lbf | 54 | 34 | 33 | 34 | 41 | 104 | 73 |
| Nail pull Sheet or 3 tab | lbf | 41 | 18 | 20 | 18 | 20 | 56 | 41 |
| Nail pull Laminate 30 F. | lbf | 81 | 53 | 60 | 62 | 71 | 130+ | 73 |
| Nail pull through 3-Tab 30 F. | lbf | 52 | 33 | 26 | 27 | 33 | 98 | 35 |
| viscosity | cP | 15000 | | | | 17000 | | |
| S.P | F. | 300 | | | | 300 | | |
| pens 25 C. | | 38 | | | | 20 | | |
| Weatherometer (hrs) pass/fail | | 3450/ 3600 | 2850/ 3000 | 2450/ 2600 | 2450/ 2600 | 4982/ 5150 | 4982/ 5150 | 4982/ 5150 |
| BYK Gardner Impact Pass | lbs-inch | 40 | 48 | 22 | 22 | 50 | 40 | 52 |
| BYK Gardner Impact Fail | lbs-inch | 42 | 50 | 24 | 24 | 52 | 42 | 54 |

| Properties | Red 1a | Red 1 | Red 2 | Red 3 | Red GR | Asphalt Shingle (Control) |
|---|---|---|---|---|---|---|
| Mat | Polyester | Glass | Glass | Glass | Glass | |
| GSM | 140 | | | | | |
| Lbs/CSF | | 1.88 | 1.88 | 1.88 | 1.88 | |
| Top surface | NA Comp. | NA Comp. | NA Comp. | NA Comp. | Granule | |
| Thickness | 96 | 88 | 73 | 49 | 136 | |
| total weight | 54.6 | 57.3 | 36.5 | 25.5 | 87.7 | |
| Top coat weight | 14.9 | 9.2 | 12.1 | 4.8 | 41.7 | |
| back coat weight | 19.9 | 3.9 | 8.0 | 3.6 | 27.4 | |
| total thickness | 94 | 90 | 56 | 52 | 160 | |
| Top coat thickness | 20 | 38 | 18 | 15 | 82 | |
| back coat thickness | 25 | 21 | 13 | 12 | 53 | |
| Max Load md | 68 | 89 | 97 | 83 | 97 | |
| Elongation @ Max md | 4 | 3 | 3 | 3 | 3 | |
| Elongation @ 5% Max md | 4 | 3 | 3 | 4 | 4 | |
| Max Load cd | 27 | 76 | 74 | 61 | 80 | |
| Elongation @ Max cd | 12 | 3 | 3 | 3 | 3 | |
| Elongation @ 5% Max cd | 42 | 4 | 3 | 3 | 3 | |
| Low Temp Flex @ −30 C. (P/F) (C.) | p 27// f −30 | p 27// f −30 | p 27// f −30 | p 27// f −30 | p 27// f −30 | |
| Tear md | 1650 | 1280 | 1000 | 860 | 950 | |
| Tear cd | 2030 | 1300 | 1250 | 960 | 1450 | |
| 45 days aged 80 C. | | | | | | |
| Max Load md | 82 | 106 | 112 | 91 | 98 | |
| Elongation @ Max md | 5 | 4 | 4 | 4 | 4 | |
| Elongation @ 5% Max md | 66 | 4 | 4 | 4 | 4 | |
| Max Load cd | 37 | 84 | 89 | 77 | 69 | |
| Elongation @ Max cd | 34 | 4 | 3 | 4 | 4 | |
| Elongation @ 5% Max cd | 54 | 4 | 3 | 4 | 4 | |
| a | 34 | | 35.6 | | | |
| b | 20 | | 21 | | | |
| dE | 26 | | 70 | | | |
| WI E313(65/10) | −141.7 | | 148.8 | | | |
| Y brightness | 9.7 | | 9.5 | | | |
| YIE313(D65/10) | 128.7 | | 135.5 | | | |
| YID1925(C/2) | 143.1 | | 138.9 | | | |
| Reflectivity | 32 | 32 | 32 | 32 | | |
| 3000 hrs WOM | | | | | | |
| a | 36.1 | | 34.1 | | | |
| b | 22.1 | | 19.9 | | | |
| dE | 25.5 | | 28 | | | |
| WI E313(65/10) | −157.1 | | −134 | | | |

TABLE 10-continued

| | | | | | |
|---|---|---|---|---|---|
| Y brightness | 9.2 | | 11.3 | | |
| Y1E313(D65/10) | 139 | | 121.6 | | |
| Y1D1925(C/2) | 143.5 | | 125.8 | | |
| Reflectivity | 0.4 | 0.4 | 0.4 | | |
| back coat thickness | 20 | 38 | 15 | 12 | 53 |
| Nail pull Laminate | 60 | 38 | 41 | 35 | 52 | 66 |
| Nail pull Sheet or 3 tab | 38 | 22 | 26 | 18 | 22 | 33 |
| Nail pull Laminate 30 F. | 86 | | 63 | 72 | 81 | 53 |
| Nail pull through 3-Tab 30 F. | 46 | 37 | 37 | 37 | 43 | 28 |
| viscosity | 18500 | | | | |
| S.P | 300 | | | | |
| pens 25 C. | 18 | | | | |
| Weatherometer (hrs) pass/fail | 3450/ 3600 | 3071/ 3271 | 3071/ 3271 | 3450/ 3600 | 4982/ 5150 | 950/ 1100 |
| BYK Gardner Impact Pass | 42.5 | 44.25 | 32 | 14 | 52 | |
| BYK Gardner Impact Fail | 44.5 | 46.25 | 34 | 16 | 54 | |

As shown in Table 10 above, the non-asphaltic (polymer-based) formulations described in Table 9 above were able to be mixed and converted into sheets on a standard manufacturing for asphaltic shingles, without any modification to the line or mixer. It was also determined through this example, that many of the properties for the sheets were higher than those of asphaltic shingles (e.g., the "Control"). This example also demonstrated that a reflective shingle could be prepared without granules (see FIG. 14). According to this example, reinforcements were appropriately selected to achieve desired properties including, for example, tensile, tear, nail pull through and/or impact. In addition, the non-asphaltic formulations of this example were determined to achieve higher performance with a thickness of around 50 mils, whereas traditional asphalt shingle layer thickness is about 90 mils.

Other Non-Asphaltic Coatings

Example 11

Other, alternative non-asphaltic coatings and coated substrates were prepared according to the formulations illustrated in Table 11 below, in order to prepare exemplary roofing materials (e.g., shingles and sheets). In general, the non-asphaltic coatings comprised oxidized hydrocarbon oil (H600T) with other components. The various coatings as per Table 11 were prepared using a mixer.

TABLE 11

| | | Coating Properties | | | | | Filled Coating Properties | | | |
|---|---|---|---|---|---|---|---|---|---|---|
| Log # | Material Description | Softening Point (F.) | PEN (dmm) | Flash Point (F.) | Viscosity @ 400 F. (cp) | Stain Index | Filler % | Softening Point (F.) | PEN (dmm) | Vis @ 400 F. (cp) |
| 221-C | Typical blown coating (CM) (Control) | 215.1 | 17 | 612 | 286.7 | 6.8 | 65 | 242 | 9 | 2418 |
| 222-C | PMA coating 1 (PMA Control 1) | 210.5 | 38.3 | 612 | 352.1 | 4.5 | 68 | 249 | 15.3 | 3648 |
| 393-R | PMA coating 2 (PMA Control 2) | 247.2 | 30.6 | 620+ | 297.5 | 4 | 65 | 263 | 13.3 | 2539 |
| 1069-R | 95%/5% Oxidized H600T(1065-R)/RT2304 | 219 | 16.7 | 590 | 358 | 7.4 | 64% | 252 | 8 | 4701 |
| 1072-R | 98.5%/1.5% Oxidized H600T(1065-R)/SBS D1191ET | 209 | 17 | 585 | 347 | 7.6 | Not tested | Not tested | Not tested | Not tested |
| 1075-R | 96.5%/3.5% Oxidized H600T(1074-R)/PIB1350 | 208 | 16.7 | 595 | 204 | 6.8 | 68% | 237 | 9 | 2394 |
| 1006-R | 88.8%/11%/0.2% Oxidized H600T/GTR MD180TR/TOR | 204.4 | 24 | 580 | 480 | 6.7 | 69 | 235 | 12 | 4954 |

TABLE 11-continued

| Log # | Material Description | Coating Properties | | | | | Filled Coating Properties | | | |
|---|---|---|---|---|---|---|---|---|---|---|
| | | Softening Point (F.) | PEN (dmm) | Flash Point (F.) | Viscosity @ 400 F. (cp) | Stain Index | Filler % | Softening Point (F.) | PEN (dmm) | Vis @ 400 F. (cp) |
| 920-R | 920-R 40% RT2304/6% Vistamaxx 6102/3% TOR/15% Rec. PVB/36% H600T | 275 | 60 | 540 | 1357 | 7 | 63 | 283 | 32 | 10750 |
| 1009-R | 94.5%/5.4%/0.1% Oxidized H600T/Recycled HDPE KWR 101-150/TOR | 255.2 | 13 | 575 | 497 | 9.2 | 65 | 257.5 | 8 | 10880 |

All material quantities are weight percent based on the total weight of the coating.

Coatings Including Asphalt as an Additive

Example 12

Coatings and coated substrates were prepared according to the formulations illustrated in Table 12 below, in which the amount of asphalt ("Holly Hard PEN asphalt and/or Moose Jaw (MJ) Hard Flux asphalt") added to the coatings was changed, to illustrate the effect of asphalt on the properties of the various coatings. The coatings were prepared using a mixer. For example, as shown in Table 12 below, the amount of asphalt ("Holly Hard PEN asphalt and/or Moose Jaw (MJ) Hard Flux asphalt") in the coatings ranged from 30% by weight to 92% by weight. (See, e.g., 921-R with 30% by weight of asphalt; 941-R with 60% by weight of asphalt; 1012-R with 76.5% by weight of asphalt; and 966-R and 967-R with 92% by weight of asphalt.)

TABLE 12

| Log # | Material Description | Coating Properties | | | | | Filled Coating Properties | | | |
|---|---|---|---|---|---|---|---|---|---|---|
| | | Softening Point (F.) | PEN (dmm) | Flash Point (F.) | Viscosity @ 400 F. (cp) | Stain Index | Filler % | Softening Point (F.) | PEN (dmm) | Viscosity @ 400 F. (cp) |
| 221-C | Typical blown coating (Control) | 215.1 | 17 | 612 | 286.7 | 6.8 | 65 | 242 | 9 | 2418 |
| 222-C | PMA coating 1 (Control 1) | 210.5 | 38.3 | 612 | 352.1 | 4.5 | 68 | 249 | 15.3 | 3648 |
| 393-R | PMA coating 2 (Control 2) | 247.2 | 30.6 | 620+ | 297.5 | 4 | 65 | 263 | 13.3 | 2539 |
| 966-R | 5.7%/0.8%/1.5%/0.08%/36%/56% Recycled HDPE(73-A)/TOR/Elvaloy AM/TMA/Holly Hard PEN asphalt/ Moose Jaw Hard Flux asphalt | 203 | 17.6 | 580 | 515 | 6 | 61 | 261 | 10.6 | 6892 |
| 967-R | 5.7%/0.8%/1.5%/0.08%/36%/56% Recycled HDPE(73-A)/TOR/Elvaloy AM/TMA/Marathon Hard PEN asphalt/Moose Jaw Hard Flux asphalt | 208 | 17 | 575 | 552 | 5.7 | 61 | 256 | 8 | 7282 |
| 921-R | 28%/4.2%/2.1%/6%/10.5%/25%/30% APAO Rextac 2304/PP Vistamaxx 6102/TOR/Recycled PVB/H600T/ Holly Navajo Hard PEN Asphalt | 270 | 45 | 565 | 1162 | Not tested | 60 | 278 | 13.3 | 8750 |
| 941-R | 16%/2.4%/1.2%/6%/14.4%/60% APP Rextac 2304/PP Vistamaxx 6102/TOR/Recycled PVB/H600T/ Holly Navajo Hard PEN Asphalt | 203 | 20.6 | 560 | 384 | 5.8 | 64 | 253 | 4 | 4027 |
| 1012-R | 76.5%/19%/2%/2.5% MJ Hard flux(1374-F)/GTR 30 Mesh/TOR 8012/PAA Wax | 262 | 48 | Not tested | 1348 | 6.5 | 65 | 258 | 26 | 3182 |

All material quantities are weight percent based on the total weight of the coating.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:
1. A roofing shingle comprising:
   a substrate comprising at least one of a fiberglass, a polyester, or any combination thereof; and
   a coating on the substrate,
      wherein the coating comprises:
         5% to 70% by weight of a non-crosslinked thermoplastic polymer, based on a total weight of the coating; and
         10% to 70% by weight of a filler, based on the total weight of the coating, wherein the filler comprises at least one of an organic filler, an inorganic mineral filler, or any combination thereof;

10% to 80% by weight of at least one of an oil, a wax, or any combination thereof, based on the total weight of the coating;

wherein the coating is free of asphalt;

wherein the coating does not comprise a foam;

wherein a thickness of the coating on the substrate is 20 mils to 200 mils.

2. The roofing shingle according to claim 1, further comprising granules.

3. The roofing shingle according to claim 1, wherein the roofing shingle exhibits an increased solar reflectance as compared to an asphaltic roofing shingle.

4. The roofing shingle according to claim 1, wherein the non-crosslinked thermoplastic polymer comprises at least one of an amorphous polyolefin, an amorphous polyalpha olefin, a polyolefin elastomer, or any combination thereof.

5. The roofing shingle according to claim 1, wherein the non-crosslinked thermoplastic polymer comprises at least one of a polypropylene, a polyethylene, a copolymer of propylene and ethylene, low density polyethylene (LDPE), linear low density polyethylene (LLDPE), high density polyethylene (HDPE), thermoplastic polyurethane (TPU), or any combination thereof.

6. The roofing shingle according to claim 1, wherein the non-crosslinked thermoplastic polymer has a Melt Flow Index, in accordance with ISO 1133, of 0.5 g/min to 40 g/min at 190° C./2.16 kg.

7. The roofing shingle according to claim 1, wherein the filler comprises at least one of calcium carbonate, barium sulfate, calcium sulfate, talc, limestone, perlite, silica, fumed silica, precipitated silica, quartz, aluminum trihydrate, magnesium hydroxide, colemanite, titanium dioxide, snow white, fly ash, graphene nanoparticles, carbon black, recycled rubber tires, recycled shingles, recycled thermoplastic resins, basalt, roofing granules, clay, or any combination thereof.

8. The roofing shingle according to claim 1, wherein the coating further comprises 5% to 80% by weight of at least one of post-consumer asphalt shingles (PCRAS), post-manufacture shingle waste, recycled asphaltic membranes, polytransoctenamer rubber (TOR), ground tire rubber (GTR), acrylonitrile rubber (NBR), acrylonitrile butadiene styrene rubber (ABS), wood plastic, or any combination thereof, based on the total weight of the coating.

9. The roofing shingle according to claim 1, wherein the coating comprises 30% to 80% by weight of at least one of the oil, the wax, or any combination thereof, based on the total weight of the coating.

10. The roofing shingle according to claim 1, wherein the coating further comprises at least one of a dye, a pigment, a fire retardant, a UV stabilizer, or any combination thereof.

11. The roofing shingle according to claim 1, wherein the non-crosslinked thermoplastic polymer comprises at least one of a copolymer of ethylene and octene, a copolymer of ethylene and hexene, a copolymer of ethylene and butene, isotactic polypropylene (IPP), atactic polypropylene (APP), polyurea, styrene-ethylene/butylene-styrene (SEBS) copolymer, styrene-ethylene/propylene-styrene (SEPS) copolymer, styrene-isoprene-styrene block (SIS) copolymer, styrene-butadiene-styrene (SBS) copolymer, polyisobutylene, polybutadiene, oxidized polyethylene, or any combination thereof.

12. The roofing shingle according to claim 1, wherein the coating further comprises polytransoctenamer rubber (TOR).

13. The roofing shingle according to claim 1, wherein the coating further comprises 1% to 10% by weight of polytransoctenamer rubber (TOR), based on the total weight of the coating.

14. The roofing shingle according to claim 1, wherein the coating comprises 30% to 99% by weight of an oxidized hydrocarbon oil, based on the total weight of the coating.

15. The roofing shingle according to claim 1, wherein the non-crosslinked thermoplastic polymer comprises at least one of a vinyl polymer, a polyvinyl ester, or any combination thereof.

16. The roofing shingle according to claim 1, wherein the non-crosslinked thermoplastic polymer comprises at least one of ethylene vinyl acetate (EVA), polyvinyl butyral (PVB), recycled polyvinyl butyral (rPVB), polyvinyl acetate (PVAC), poly(vinyl butyrate), poly(vinyl propionate), poly(vinyl formate), copolymers of PVAC, or any combination thereof.

17. The roofing shingle according to claim 1, wherein the coating having a viscosity of 3,000 cP to 30,000 cP at 375° F. to 400° F. as measured according to ASTM D 4402.

* * * * *